(12) United States Patent
Zhang et al.

(10) Patent No.: US 10,016,747 B2
(45) Date of Patent: Jul. 10, 2018

(54) BASE STOCK PRODUCTION USING A HIGH ACTIVITY CATALYST

(71) Applicants: Lei Zhang, Basking Ridge, NJ (US); Sylvain Hantzer, Spring, TX (US); Wenyih F. Lai, Bridgewater, NJ (US); Stephen J. McCarthy, Center Valley, PA (US); Tracie L. Owens, Hillsborough, NJ (US)

(72) Inventors: Lei Zhang, Basking Ridge, NJ (US); Sylvain Hantzer, Spring, TX (US); Wenyih F. Lai, Bridgewater, NJ (US); Stephen J. McCarthy, Center Valley, PA (US); Tracie L. Owens, Hillsborough, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 287 days.

(21) Appl. No.: 14/887,492

(22) Filed: Oct. 20, 2015

(65) Prior Publication Data

US 2016/0121315 A1 May 5, 2016

Related U.S. Application Data

(60) Provisional application No. 62/164,790, filed on May 21, 2015, provisional application No. 62/074,220, filed on Nov. 3, 2014.

(51) Int. Cl.
*B01J 29/70* (2006.01)
*C10M 101/02* (2006.01)
(Continued)

(52) U.S. Cl.
CPC ............. *B01J 29/703* (2013.01); *B01J 29/74* (2013.01); *C10G 45/64* (2013.01); *C10G 65/043* (2013.01); *C10G 65/12* (2013.01); *C10M 101/02* (2013.01)

(58) Field of Classification Search
CPC ....... B01J 29/703; B01J 29/74; C10G 65/043; C10G 45/64; C10G 65/12; C10M 101/02
See application file for complete search history.

(56) References Cited

U.S. PATENT DOCUMENTS 3,306,922 A 2/1967 Barrer et al.
3,354,078 A 11/1967 Miale et al.
(Continued)

FOREIGN PATENT DOCUMENTS

CN 102452667 A 5/2012
EP 0023089 A1 1/1981
(Continued)

OTHER PUBLICATIONS

Miale, J.N. et al., "Catalysis by Crystalline Aluminosilicates IV. Attainable Catalytic Cracking Rate Constants, and Superactivity," Journal of Catalysis, 1966, vol. 6, pp. 278-287.
(Continued)

*Primary Examiner* — Randy Boyer
*Assistant Examiner* — Juan C Valencia
(74) *Attorney, Agent, or Firm* — Scott F. Yarnell

(57) ABSTRACT

Methods are provided for using a dewaxing catalyst formed using at least two structure directing agents for production of a lubricant base stock. For example, ZSM-48 crystals formed using multiple directing agents (and/or formulated catalysts made using such crystals) can have an increased activity and/or can provide an improved yield during catalytic production of lubricant base stocks. Additionally or alternately, ZSM-48 crystals formed using multiple directing (Continued)

XRD on Example 5 agents (and/or formulated catalysts made using such crystals) can provide improved aromatic saturation during processing of a feed for lubricant base stock production.

19 Claims, 7 Drawing Sheets

(51) Int. Cl.
    *C10G 45/64* (2006.01)
    *C10G 65/12* (2006.01)
    *C10G 65/04* (2006.01)
    *B01J 29/74* (2006.01)

(56) References Cited

U.S. PATENT DOCUMENTS

| | | | |
|---|---|---|---|
| 3,832,449 | A | 8/1974 | Rosinski et al. |
| 4,326,994 | A | 4/1982 | Haag et al. |
| 4,397,827 | A * | 8/1983 | Chu ............... B01J 29/703 423/331 |
| 6,923,949 | B1 | 8/2005 | Lai et al. |
| 7,482,300 | B2 | 1/2009 | Lai et al. |
| 8,003,074 | B2 | 8/2011 | Lai et al. |
| 2003/0105248 | A1* | 6/2003 | Cao ............... B01J 29/06 526/72 |
| 2007/0131581 | A1* | 6/2007 | Lai ............... B01J 29/703 208/27 |
| 2009/0076317 | A1* | 3/2009 | Lai ............... B01J 29/703 585/852 |
| 2013/0264246 | A1* | 10/2013 | Holtzer ............... C10G 65/12 208/19 |

FOREIGN PATENT DOCUMENTS

| | | |
|---|---|---|
| EP | 1330412 B1 | 4/2007 |
| WO | 2007/070522 A1 | 6/2007 |
| WO | 2009038740 A2 | 3/2009 |

OTHER PUBLICATIONS

Olson, D. H. et al., "Chemical and Physical Properties of the ZMS-5 Substitutional Series," Journal of Catalysis, 1980, vol. 61, pp. 390-396.
Weisz, P.B. et al., "Superactive Crystalline Aluminosilicate Hydrocarbon Catalysts," Journal of Catalysis, 1965. vol. 4, pp. 527-529.
Emdadi et al., "Dual Template Synthesis of Meso- and Microporous MFI Zeolite Nanosheet Assemblies with Tailored Activity in Catalytic Reactions", Chemistry of Materials, Feb. 11, 2014, pp. 1345-1355, vol. 26, No. 3, ACS Publications.
The International Search Report and Written Opinion of PCT/US2015/056341 dated Jan. 22, 2016.
The International Search Report and Written Opinion of PCT/US2015/056327 dated Feb. 11, 2016.

* cited by examiner

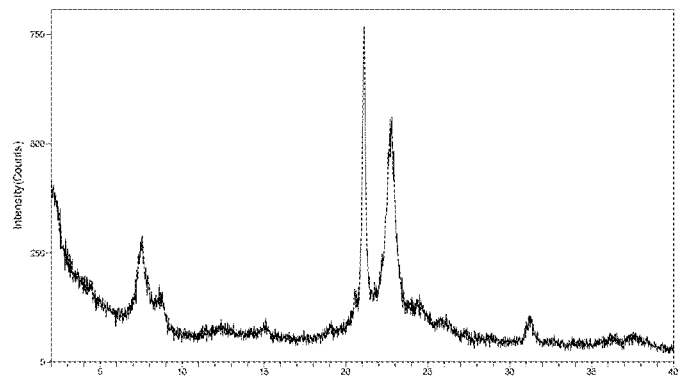
Figure 1: XRD on Example 5
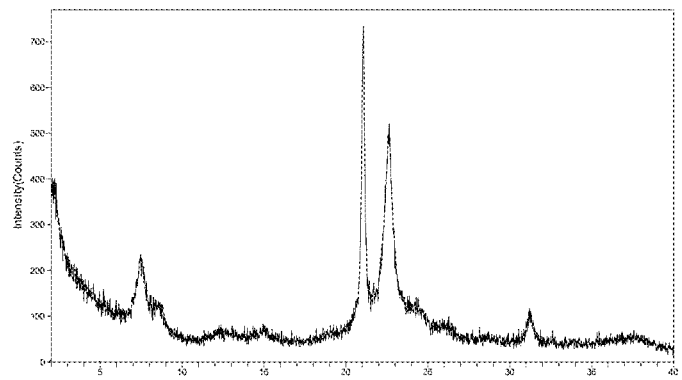
Figure 2: XRD on Example 7
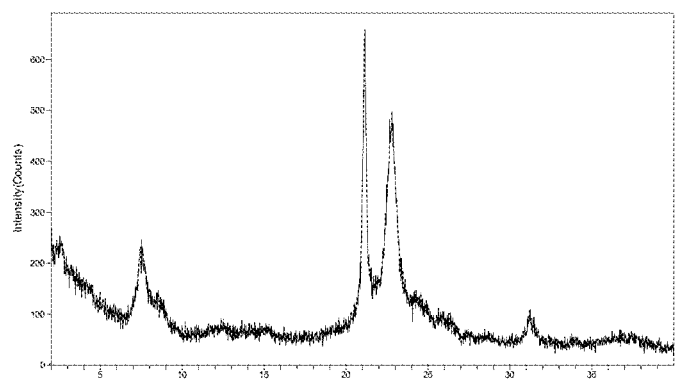
Figure 3: XRD on Example 9

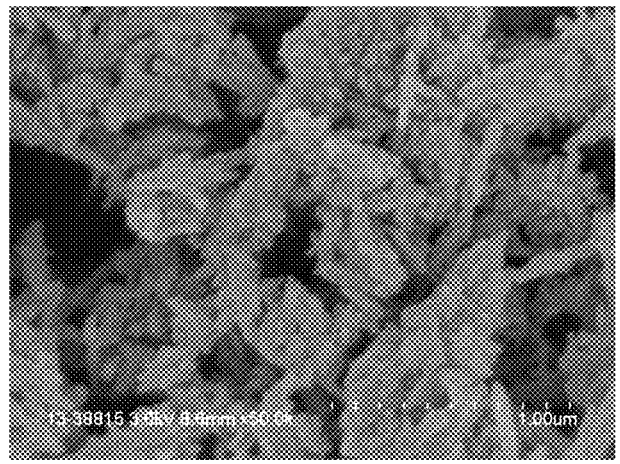
Figure 4: SEM on Example 5
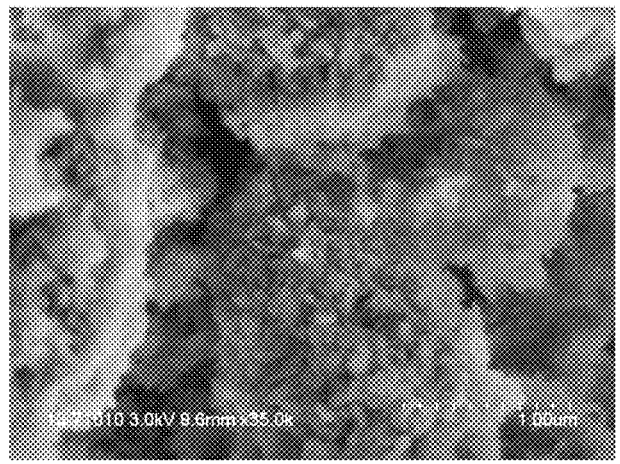
Figure 5: SEM on Example 7
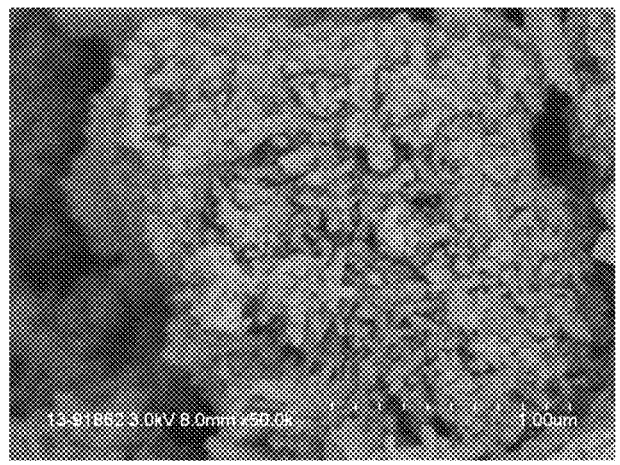
Figure 6: SEM on Example 9

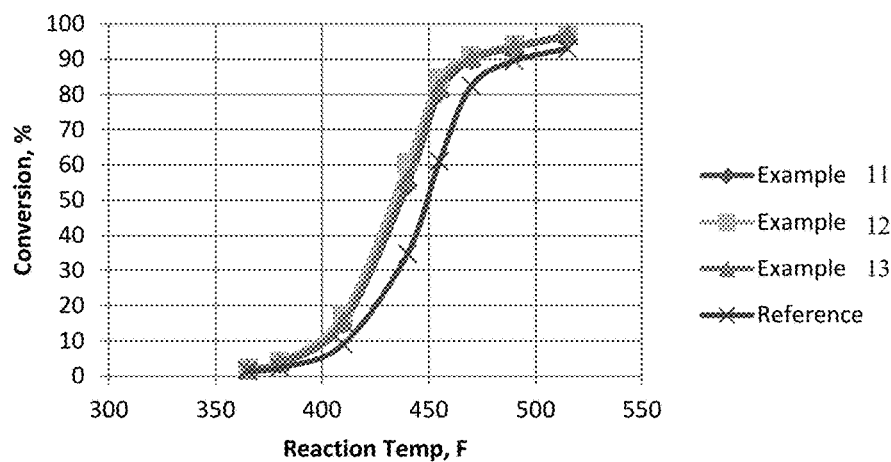
Figure 7: Conversion vs. Reaction temperatures
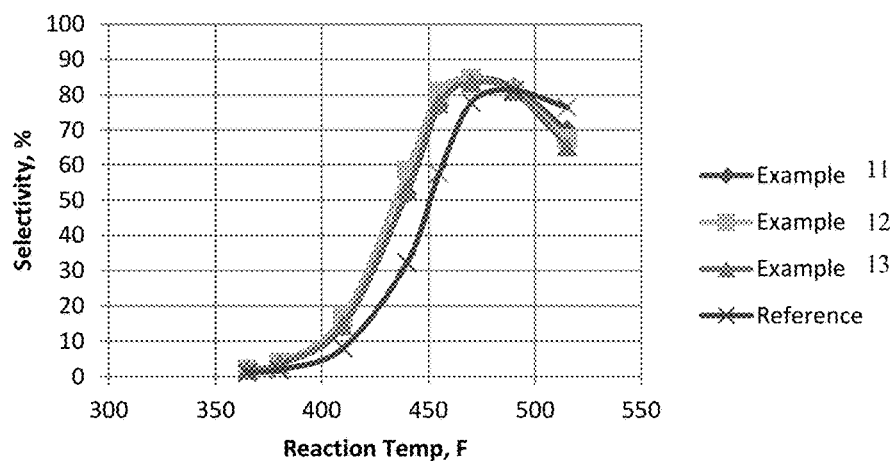
Figure 8: Selectivity vs. Reaction temperatures

BASE STOCK PRODUCTION USING A HIGH ACTIVITY CATALYST

CROSS-REFERENCE TO RELATED APPLICATIONS

This application claims priority to U.S. Provisional Application Ser. No. 62/164,790 filed May 21, 2015 and U.S. Provisional Application Ser. No. 62/074,220 filed Nov. 3, 2014, which are both herein incorporated by reference in their entirety.

FIELD

Methods are provided for production of lubricant base stocks using a high activity dewaxing catalyst.

BACKGROUND

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One type of zeolite structure used for catalytic processing of petroleum streams is ZSM-48, which is a zeolite of the MRE framework type. As for many zeolites, the composition of the synthesis mixture used to form ZSM-48 (or other MRE framework type zeolites) can have a strong impact on the crystalline structure and/or morphology of the resulting zeolites.

U.S. Pat. No. 6,923,949 describes methods for forming ZSM-48 crystals using synthesis mixtures that include non-ZSM-48 seed crystals. The resulting ZSM-48 crystals can have an X-ray diffraction pattern corresponding to ZSM-48, although the presence of the non-ZSM-48 seed crystals can be detected based on activity tests. For crystals having a silica to alumina ratio of 70 to 1 to 150 to 1, the ZSM-48 crystals formed using non-ZSM-48 seeds are described as being small, irregularly shaped crystals that are free from fibrous morphology. For crystals with a silica to alumina ratio of less than 70 to 1, the ZSM-48 crystals are described as being mixtures of small, irregularly shaped crystals and needle morphology crystals.

U.S. Pat. No. 7,482,300 describes methods for forming ZSM-48 crystals without the use of non-ZSM-48 seeds in the synthesis mixture for forming the crystals. The structure directing agent used for forming the ZSM-48 crystals is described as a hexamethonium salt, such as hexamethonium chloride. The resulting crystals can have a silica to alumina ratio from 70 to 1 to 110 to 1, and are described as being substantially free of fibrous morphology. Preferred ranges are also described for the molar ratio of OH$^-$ to SiO$_2$ and the molar ratio of structure directing agent (or template) to SiO$_2$. The preferred ranges are described as suitable for formation of crystals that are substantially free of needle-like morphology crystals.

U.S. Pat. No. 8,003,074 describes methods for forming ZSM-48 crystals using a diquaternary ammonium salt structure directing agent with a 5 carbon atom alkyl chain between the ammonium ions (a "diquat-5" structure directing agent). Synthesis of ZSM-48 crystals using mixtures of a "diquat-5" structure directing agent and other structure directing agents, such as a "diquat-6" structure directing agent, is also described. Various types of synthesis mixtures are described that result in formation of fibrous and/or needle-like crystal morphologies.

U.S. Pat. No. 4,326,994 describes methods for enhancement of zeolite catalytic activity. The methods include contacting zeolite catalysts with water for a sufficient treating time, temperature, and water partial pressure to bring about increased activity.

SUMMARY

In one aspect, a method for processing a feed using a catalyst formed using a dominant structure directing agent and a secondary structure directing agent is provided. The method includes exposing a feedstock having a T5 boiling point of at least 400° F. (204° C.) to a catalyst comprising ZSM-48 crystals under effective dewaxing conditions to form a dewaxed effluent, at least a portion of the ZSM-48 crystals being crystallized from reaction mixture including a dominant structure directing agent cation and a secondary structure directing agent cation, an amount of secondary structure directing agent cation in the reaction mixture being at least 20 mole % of a combined amount of dominant structure directing agent cation and secondary structure directing agent cation in the reaction mixture, the ZSM-48 crystals having a molar ratio of SiO$_2$ to Al$_2$O$_3$ of 65 to 120.

BRIEF DESCRIPTION OF THE FIGURES

FIG. 1 shows an XRD plot of ZSM-48 crystals synthesized according to the method in Example 5.

FIG. 2 shows an XRD plot of ZSM-48 crystals synthesized according to the method in Example 7.

FIG. 3 shows an XRD plot of ZSM-48 crystals synthesized according to the method in Example 9.

FIG. 4 shows SEM images of ZSM-48 crystals synthesized according to the method in Example 5.

FIG. 5 shows SEM images of ZSM-48 crystals synthesized according to the method in Example 7.

FIG. 6 shows SEM images of ZSM-48 crystals synthesized according to the method in Example 9.

FIGS. 7 and 8 show conversion and selectivity results from conversion of a decane feed exposed to various catalysts.

DETAILED DESCRIPTION

Figure 9:
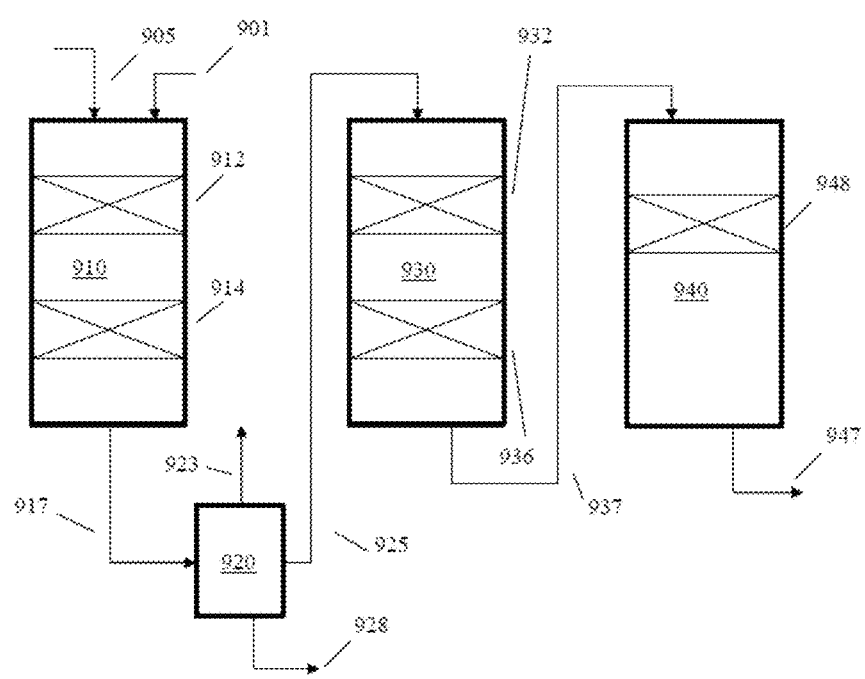
FIG. 9 schematically shows an example of a reaction system for processing a feedstock.

All numerical values within the detailed description and the claims herein are modified by "about" or "approximately" the indicated value, and take into account experimental error and variations that would be expected by a person having ordinary skill in the art.

Overview

In various aspects, methods are provided for synthesis of ZSM-48 crystals (or other types of zeolites or molecular sieves) using a synthesis mixture containing at least two structure directing agents. For a synthesis mixture having a specified composition under the synthesis conditions, a first structure directing agent can be a directing agent that enables formation of ZSM-48, or that enables formation of another desired zeolite or molecular sieve. A second structure directing agent can be a directing agent that enables formation of a molecular sieve different from ZSM-48 (or different from the other desired zeolite) under at least some synthesis conditions. Additionally, the second structure directing does not enable formation of ZSM-48 for the synthesis mixture having the specified composition under the synthesis conditions being used. In various aspects, the presence of the second structural directing agent does not substantially alter the structure and morphology of the molecular sieve crystals generated by the synthesis mixture. Instead, the synthesis mixture generates ZSM-48 crystals based on the combined amount of directing agents present as if all (or at least substantially all) of the directing agent in the synthesis mixture corresponds to the first directing agent.

Additionally or alternately, in various aspects methods are provided for using a dewaxing catalyst formed using at least two structure directing agents for production of a lubricant base stock. For example, ZSM-48 crystals formed using multiple directing agents (and/or formulated catalysts made using such crystals) can have an increased activity and/or can provide an improved yield during catalytic production of lubricant base stocks. Additionally or alternately, ZSM-48 crystals formed using multiple directing agents (and/or formulated catalysts made using such crystals) can provide improved aromatic saturation during processing of a feed for lubricant base stock production.

Dominant and Secondary Directing Agents for Synthesis of Molecular Sieves

Methods described herein can be suitable for synthesis of various types of zeolites using synthesis mixtures that contain a dominant structure directing agent and one or more secondary structure directing agents that do not substantially alter the crystal structure and morphology of the crystals generated by a synthesis mixture in the presence of the dominant structure directing agent. It is noted that the dominant structure directing agent may represent a plurality of structure directing agents.

A dominant structure directing agent for forming a zeolite (or molecular sieve) of a given framework type is defined herein as a structure directing agent that, when used alone, induces formation of the zeolite (or molecular sieve) for a synthesis mixture having a specified ratio of reactants at a specified set of synthesis conditions. The specified ratio of reactants refers to the relative ratios of components that are typically expected in a synthesis mixture suitable for forming a molecular sieve. For example, for a synthesis mixture suitable for forming an aluminosilicate zeolite, the ratios of the expected components in the synthesis mixture can include, but are not limited to, the ratio of silica ($SiO_2$) to hydroxyl ions; the ratio of silica to alumina; the ratio of silica to sodium and/or other alkali metals; the ratio of silica to water; and the ratio of silica to the total amount of structure directing agent or template. More generally, if another tetravalent oxide is used in place of silica or in addition to silica, the ratios of expected components can include the ratio of tetravalent oxides ($XO_2$) to hydroxyl ions; the ratio of tetravalent oxides to trivalent oxides ($X_2O_3$); the ratio of tetravalent oxides to sodium or other alkali metals; the ratio of tetravalent oxides to water; and the ratio of tetravalent oxides to the total amount of structure directing agent or template. It is also noted that similar ratios can also be defined for synthesis mixtures that include sources of divalent oxides (XO) in the synthesis mixture.

A secondary structure directing agent for forming a zeolite (or molecular sieve) of a given framework type is defined herein as a structure directing agent that, when used alone, is suitable for formation of a molecular sieve under at least some synthesis conditions. However, when the secondary structure directing agent is used as part of a synthesis mixture containing a dominant structure directing agent under synthesis conditions suitable for forming ZSM-48 (or another target molecular sieve that is enabled by the dominant structure directing agent), the secondary structure directing agent does not substantially alter the crystal structure and/or morphology of the crystals resulting from the synthesis mixture. Instead, the crystals can correspond to the crystals that would be expected based on generating molecular sieve crystals from a synthesis mixture containing an amount of the dominant structure directing agent corresponding to the total amount of all structure directing agents in the synthesis mixture under the synthesis conditions. In this definition, it is noted that a secondary structure directing agent is a directing agent effective as a template for forming a molecular sieve under a set of synthesis conditions, but not necessarily synthesis conditions similar to the conditions for the synthesis mixture where it is acting as a secondary directing agent. In some aspects, the secondary structure directing agent can be a structure directing agent that does not enable formation of ZSM-48 under any synthesis conditions. Alternatively, the secondary structure directing agent can be a structure directing agent that does not enable formation of the molecular sieve that is enabled by use of the dominant structure directing agent.

When determining the ratios of components within a synthesis mixture, the combined amount of dominant structure directing agent and secondary directing agent is used to determine the ratios, even though the secondary directing agent does not substantially impact the crystal structure and morphology. Typically this can be specified based on the molar amounts of the structure directing agent cations present in the synthesis mixture. This can allow a less expensive secondary structure directing agent and/or a secondary structure directing agent that also serves another purpose to be used in a synthesis mixture in place of a portion of the dominant structure directing agent. In various aspects, the amount of secondary structure directing agent cation in a synthesis mixture can be at least 20 mole % of the combined amount of dominant structure directing agent cation and secondary structure directing agent cation in the synthesis mixture, such as at least 25 mole %, or at least 30 mole %.

For example, some directing agents can also serve as a source of $OH^-$ ions in a synthesis mixture. An example of such a secondary directing agent is a tetraalkyl ammonium hydroxide. Tetraalkyl ammonium hydroxides are known as being suitable directing agents for formation of some types of molecular sieves, but are also sufficiently basic to contribute to the $O^-$ concentration of a synthesis mixture. Thus, in addition to being a secondary structure directing agent, a tetraalkyl ammonium hydroxide can also be used in place of at least a portion of another basic compound or source of hydroxyl ions, such as an alkali hydroxide. Reducing the concentration of alkali hydroxide can be beneficial as some impurity phases are more likely to form with increasing alkali content. For example, increasing the amount of sodium in a synthesis mixture can increase the likelihood and/or amount of formation of Kenyaite (sodium silicate) from a synthesis mixture.

Using a tetraalkyl ammonium hydroxide as a secondary structure directing agent can allow for a reduction in the amount of sodium hydroxide in the synthesis mixture, thus reducing the likelihood of forming sodium silicate. In some aspects, a ratio of the amount of secondary structure directing agent to the amount of hydroxyl ions in a synthesis mixture can be at least 1:10, or at least 1:9, or at least 1:8, or at least 1:6. Additionally or alternately, the ratio of the amount of secondary structure directing agent to the amount of hydroxyl ions can be 1:4 or less, or 1:5 or less.

For aspects related to synthesis of ZSM-48 (or other MRE framework zeolites as described in the zeolite database maintained by the International Zeolite Association), any convenient structure directing agent suitable for use in a synthesis mixture for formation of ZSM-48 can be used as a dominant structure directing agent. One option can be to use a diquaternary alkylammonium salt with a 6 carbon atom chain between the ammonium ions (diquat-6). Another option can be to use a diquaternary alkylammonium salt with a 5 carbon atom chain between the ammonium ions (diquat-5). Both diquat-5 and diquat-6 are known to be suitable as structure directing agents for formation of ZSM-48, although the resulting ZSM-48 crystals generated by diquat-5 and diquat-6 are typically different. It is believed that mixtures of diquat-5 and diquat-6 tend to produce ZSM-48 crystals having a crystal morphology corresponding roughly to the average of the crystal morphology that would be expected based on use of the individual structure directing agents in a reaction mixture. Therefore, under the definition of a dominant structure directing agent within this discussion, if both diquat-5 and diquat-6 are present in a synthesis mixture, the synthesis mixture is defined as having multiple dominant structure directing agents. Another structure directing agent that does not substantially impact the morphology and crystal structure would need to be present for such a synthesis mixture to have a secondary directing agent in the synthesis mixture.

As another type of example, a synthesis mixture can be formed that includes a dominant structure directing agent for forming a desired zeolite. The synthesis mixture can also include a tetralkyl ammonium hydroxide as a secondary directing agent. This can allow for formation of a variety of zeolites where tetraalkyl ammonium hydroxide is useful as a secondary directing agent. Suitable zeolites where tetraalkyl ammonium hydroxides may be useful as a secondary directing agent can include, but are not limited to a) zeolites where the largest pore sizes are from 4.8 Angstroms to 6.0 Angstroms; b) zeolites where the largest pore size corresponds to a 10 member ring or a 12 member ring; c) molecular sieves of framework type MRE, MTT, EUO, AEL, AFO, SFF, STF, or TON; d) molecular sieves of framework type OSI, ATO, GON, MTW, SFE, SSY, or VET; or e) combinations thereof.

Synthesis Mixtures and Conditions

In this discussion, various examples may describe the use of $SiO_2$, $Al_2O_3$, and an alkali metal for synthesis of zeolites. In the discussion herein, it is understood that other crystals having a zeolite framework structure can generally be synthesized using other tetravalent elements in place of or in combination with silicon, such as tin, germanium, or a combination thereof; other trivalent elements in place of or in combination with aluminum, such as boron, indium, gallium, iron, or a combination thereof; and other alkali or alkaline earth elements in place of or in combination with sodium, such as potassium, magnesium, calcium, or a combination thereof. Thus, when a ratio of $SiO_2:Al_2O_3$ is described, it is understood that similar ratios of $XO_2:Y_2O_3$ may also be suitable for formation of a material having the corresponding zeolite framework structure.

In some aspects, the ZSM-48 crystals recovered from a reaction mixture can correspond to substantially pure ZSM-48 crystals. Substantially pure ZSM-48 crystals are defined herein as ZSM-48 crystals that contain less than 10 wt % of another type of zeolite and/or impurity, such as ZSM-50 or Kenyaite. Preferably, the substantially pure ZSM-48 crystals can contain less than 5 wt % of another type of zeolite, such as less than 3 wt % of another type of zeolite, or less than 1 wt % of another type of zeolite. More preferably, the substantially pure ZSM-48 crystals can contain less than 10 wt % of another type of zeolite (such as ZSM-50) or an impurity such as Kenyaite. In such aspects, the substantially pure ZSM-48 crystals can contain less than 5 wt % of another type of zeolite or impurity, such as less than 3 wt % of another type of zeolite or impurity, or less than 1 wt % of another type of zeolite or impurity.

In some aspects, the disclosure can relate to ZSM-48 crystals in a particular morphology, and a method of making the ZSM-48 composition. The ZSM-48 crystals can be "as-synthesized" crystals that still contain the organic template, or the crystals can be calcined crystals, such as K-form ZSM-48 crystals or Na-form ZSM-48 crystals, or the crystals can be calcined and ion-exchanged crystals, such as H-form ZSM-48 crystals. In some aspects, a synthesis mixture that is "free of non-ZSM-48 seed crystals" can be a reaction mixture used for forming the ZSM-48 does not contain non-ZSM-48 seed crystals. In some aspects, ZSM-48 crystals synthesized according to the disclosure are either synthesized without the use of seed crystals, or with ZSM-48 seed crystals for seeding.

The X-ray diffraction pattern (XRD) of the ZSM-48 crystals according to the disclosure is that exhibited by ZSM-48, i.e., the D-spacings and relative intensities correspond to those of pure ZSM-48. While XRD can be used to establish the identity of a given zeolite, it cannot be used to distinguish a particular morphology. For example, the needle-like and platelet forms for a given zeolite will exhibit the same diffraction patterns. In order to distinguish between different morphologies, it is necessary to use an analytical tool with greater resolution. An example of such a tool is scanning electron microscopy (SEM). Photomicrographs from SEM can be used to identify crystals with different morphologies.

In some aspects, a dominant structure directing agent and a secondary structure directing agent can be used for synthesis of ZSM-48 crystals. The ZSM-48 crystals after removal of the structural directing agent can have a particular morphology and a molar composition according to the general formula: $(n)SiO_2:Al_2O_3$ where n is from 65 to 110, or 70 to 100, or 80 to 95. In another aspect, n can be at least 65, or at least 70, or at least 80, or at least 85, or at least 90. Additionally or alternately, n can be 110 or less, or 100 or less, or 95 or less. Additionally or alternately, Si may be replaced by Ge and Al may be replaced by Ga, B, Fe, Ti, V, and Zr. More generally, the molar composition can include a ratio of $(n)SiO_2:Al_2O_3$ where n is from 50 to 200.

The as-synthesized form of ZSM-48 crystals can be prepared from a mixture having silica, alumina, base, a dominant structure directing agent, and secondary structure directing agent. In an aspect, the molar ratio of the total amount of structure directing agent (both dominant and secondary) to silica in the mixture can be less than 0.20, or less than 0.15, or less than 0.10, or less than 0.05, or less than 0.04, or less than 0.03, or less than 0.025. Additionally or alternately, the molar ratio of structural directing agent to silica in the mixture can be at least 0.01, or at least 0.015, or at least 0.016. In still another aspect, the molar ratio of structural directing agent to silica in the mixture can be from 0.015 to 0.04, or 0.02 to 0.035. In an aspect, the as-synthesized form of ZSM-48 crystals can have a silica:alumina molar ratio of 65 to 110. In still another aspect, the as-synthesized form of ZSM-48 crystals can have a silica:alumina molar ratio of at least 65, or at least 70, or at least 80, or at least 85. In yet another aspect, the as-synthesized form of ZSM-48 crystals can have a silica:alumina molar ratio of 110 or less, or 100 or less, or 95 or less. It should be noted that the as-synthesized form of ZSM-48 crystals may have molar ratios different from the molar ratios of reactants of the reaction mixture used to prepare the as-synthesized form. This result may occur, for example, due to incomplete incorporation of 100% of the reactants of the reaction mixture into the crystals formed (from the reaction mixture).

In some aspects, the ZSM-48 zeolite in either a calcined or as-synthesized form can form agglomerates of small crystals that may have crystal sizes in the range of 0.01 to 1 μm. These small crystals can be desirable for they generally lead to greater activity. Smaller crystals can mean greater surface area which leads to a greater number of active catalytic sites per given amount of catalyst.

In some aspects, the ZSM-48 crystals in either a calcined or as-synthesized form can have a morphology containing fibrous crystals. By fibrous is meant crystals that have a L/D ratio of >10/1, where L and D represent the length and diameter of the crystal. Depending on the aspect, at least 10% of the crystals can be fibrous crystals, such as at least 20%, or at least 30%, or at least 40%. Additionally or alternatively, the ZSM-48 crystals can have a substantially fibrous crystal morphology, such as at least 50% of the crystals having a fibrous morphology, or at least 70%, or at least 85%. The percentage of crystals having a morphology can be determined by counting based on, for example, SEM micrographs. Alternatively, the examination technique (such as SEM) can be used to determine that the volume of fibrous crystals corresponds to any of the above amounts. The resolution scale (1 μm) is shown on the photomicrographs in the present figures.

In additional or alternative aspects, at least a portion of the ZSM-48 crystals in either a calcined or as-synthesized form can be needle-like crystals. By needle-like is meant crystals that have a L/D ratio of <10/1, preferably less than 5/1, more preferably between 3/1 and 5/1. Depending on the aspect, at least 10% of the crystals can be needle-like morphology crystals, such as at least 20%, or at least 30%, or at least 40%. Additionally or alternatively, the ZSM-48 crystals can have a substantially needle-like crystal morphology, such as at least 50% of the crystals having a needle-like morphology, or at least 70%, or at least 85%. The percentage of crystals having a morphology can be determined by counting based on, for example, SEM micrographs. Alternatively, the examination technique (such as SEM) can be used to determine that the volume of needle-like crystals corresponds to any of the above amounts.

In still further additional or alternative aspects, the ZSM-48 crystals in either a calcined or as-synthesized form can include at least a combined amount of crystals having a fibrous crystal morphology and a needle-like crystal morphology. Depending on the aspect, the combined amount of crystals having a fibrous crystal morphology or a needle-like crystal morphology can be at least 50% of the crystals, such as at least 60% of the crystals, or at least 70%, or at least 85%. The percentage of crystals having a morphology can be determined by counting based on, for example, SEM micrographs. Alternatively, the examination technique (such as SEM) can be used to determine that the combined volume of crystals having either fibrous or needle-like morphology corresponds to any of the above amounts. It is noted that the combined amount of crystals having a fibrous or needle-like morphology is explicitly contemplated as being combined with any of the individual amounts of fibrous crystal morphology and/or any of the individual amounts of needle-like crystal morphology combined above. Thus, in an exemplary aspect, the ZSM-48 crystals in either a calcined or as-synthesized form can be at least 50% of the crystals, such as at least 60% of the crystals, or at least 70%, or at least 85%. In such an exemplary aspect, the amount of fibrous crystals can be any of the above noted amounts, such as at least 10%, or at least 20%, or at least 30%, or at least 40%, or at least 50%, and/or the amount needle-like crystals can be any of the above noted amounts, such as at least 10%, or at least 20%, or at least 30%, or at least 40%, or at least 50%.

More generally, in the present method, a reaction mixture can be produced comprising a source of water, a source of an oxide of a tetravalent element, Y, selected from at least one of silicon, tin, titanium, vanadium, and germanium, a source of an oxide of trivalent element, X, selected from at least one of aluminum, boron, gallium, iron, and chromium, a source of an alkali metal (preferably not sodium), M, together with a source of two or more directing agents, Q. Generally, the composition of the reaction mixture can be controlled so that the molar ratio $Q/YO_2$ in said reaction mixture is in the range from 0.01 to 0.10, or 0.01 to 0.05, e.g., from 0.01 to 0.03, or from 0.015 to 0.025. Additionally or alternately, the composition of the reaction mixture can be controlled by selecting one or more of the following molar ratios: $YO_2/X_2O_3$ from 50 to 200, or 50 to 150, e.g., from 50 to 120, from 50 to 110, from 60 to 150, from 60 to 120, from 60 to 110, from 65 to 150, from 65 to 120, from 65 to 110; $H_2O/YO_2$ from 1 to 500, e.g., from 5 to 200, from 5 to 150, from 5 to 100, from 5 to 50, from 5 to 35, from 10 to 200, from 10 to 150, from 10 to 100, from 10 to 50, from 10 to 35, from 14 to 200, from 14 to 150, from 14 to 100, from 14 to 50, from 14 to 35; $OH^-/YO_2$ from 0.1 to 0.3, e.g., from 0.1 to 0.25, from 0.1 to 0.2, from 0.1 to 0.18, from 0.14 to 3, from 0.14 to 0.25, from 0.14 to 0.2, from 0.14 to 0.18; and $M/YO_2$ from 0.05 to 0.5, e.g., from 0.05 to 0.4, from 0.05 to 0.35, from 0.05 to 0.3, from 0.05 to 0.25, from 0.10 to 0.5, from 0.10 to 0.4, from 0.10 to 0.3, from 0.10 to 0.25, from 0.15 to 0.5, from 0.15 to 0.4, from 0.15 to 0.3, from 0.15 to 0.25. It should be noted that, although molar ratios of $OH^-/YO_2$ are used throughout this description, it should be understood that such molar ratios are meant to encompass whatever the chemical nature of the non-detrimental counterions of M and Q, and are only expressed herein as $OH^-/YO_2$ because hydroxyl counterions were specifically used. Similarly, where specific examples of Y, X, M, and Q are mentioned herein in molar ratios, their ranges should be understood to extend generically to the variable, unless expressly disclaimed, and not necessarily merely limited to the individual species of the variable genus.

The silica source can preferably be precipitated silica such as Ultrasil™ or HiSil™ that are commercially available from Evonik Degussa or PPG Industries. Other silica sources include powdered silica including precipitated silica such as Zeosil™ and silica gels, silicic acid colloidal silica such as Ludox™ or dissolved silica. In the presence of a base, these other silica sources may form silicates. The alumina may be in the form of a soluble salt, and preferably can be a salt that does not include sodium. Suitable aluminum sources can include aluminum salts such as the chloride, aluminum alcoholates or hydrated alumina such as gamma alumina, pseudobohemite and colloidal alumina.

The base used to dissolve the metal oxide can be any alkali metal hydroxide (such as sodium hydroxide, lithium hydroxide, or potassium hydroxide), ammonium hydroxide, diquaternary hydroxide and the like. In some aspects, a portion of the base can be sodium hydroxide while a second portion can be an alkali metal hydroxide different from sodium. In some aspects, a portion of the base can be sodium hydroxide and/or another hydroxide described above, while a second portion can be a hydroxide that can also serve as a secondary structure directing agent.

In various aspects, the dominant structure directing agent can be a salt based on a diquaternary ammonium cation. In particular, the cation portion of the salt can be represented by the formula $R_1$-$R_3$-$R_2$, where $R_1$ and $R_2$ are the same or different. $R_1$ and $R_2$ can be tetraalkylammonium groups having the formula $R_3$—$N^+$—RR'R", where R, R', and R" can each be alkyl groups and can each be the same or different. The R, R', and R" alkyl groups on a tetraalkylammonium group can each be an alkyl group having from 1 to 10 carbons, and preferably 4 carbons or less, such as a methyl group or an ethyl group. In some aspects, $R_3$ can be a polymethylene group of formula $(CH_2)_n$, where n=6. This type of cation can be referred to as a "diquat-6" cation. One example of a diquat-6 cation is a hexamethammonium cation, where $R_1$ and $R_2$ are the same, and R, R', and R" are each a methyl group. The anion portion of the diquat-6 salt can be chloride ions or other anions such as hydroxide, nitrate, sulfate, other halide and the like. For example, hexamethonium chloride is N,N,N,N',N',N'-hexamethyl-1, 6-hexanediammonium dichloride. In other aspects, $R_3$ can be a polymethylene group of formula $(CH_2)_n$, where n=5. This type of cation can be referred to as a "diquat-5" cation.

The secondary structure directing agent can be any convenient compound that is capable of acting as a structure directing agent under some synthesis conditions, but that does not substantially alter the crystal structure and morphology when included in a synthesis mixture that also contains a dominant structure directing agent under a specified set of synthesis condition. One example of a suitable secondary structure directing agent is a tetraalkyl ammonium hydroxide, such as tetramethyl ammonium hydroxide or tetraethyl ammonium hydroxide. Other alkyl groups can also be used, such as propyl or butyl groups. Optionally, the alkyl groups of the tetraalkyl ammonium hydroxide can be different from one another, such as using at least one methyl and at least one ethyl, or at least one ethyl and at least one propyl, or any other type of convenient combination of alkyl groups.

In the synthesis of the ZSM-48 crystals, the reactants including silicate salt, aluminate salt, base and directing agent can be mixed together with water in the ratios set forth above and heated with stirring at 100° C. to 250° C. The crystals may be formed from reactants or in the alternative, ZSM-48 seed crystals may be added to the reaction mixture. The ZSM-48 seed crystals may be added to enhance the rate of crystal formation but do not otherwise affect crystal morphology. The ZSM-48 crystals can be purified, usually by filtration, and washed with deionized water.

In various aspects, the crystals obtained from the synthesis according to the disclosure can have a composition that is free of non ZSM-48 seed crystals and free of ZSM-50. In various aspects, the ZSM-48 crystals can have a low quantity of Kenyaite. For example, the amount of Kenyaite can be 5% or less, or 2% or less, or 1% or less. In an alternative aspect, the ZSM-48 crystals can be free of Kenyaite.

The as-synthesized ZSM-48 crystals should be at least partially dried prior to use or further treatment. Drying may be accomplished by heating at temperatures of from 100° C. to 400° C., preferably from 100° C. to 250° C. Pressures may be atmospheric or subatmospheric. If drying is performed under partial vacuum conditions, the temperatures may be lower than those at atmospheric pressures.

Catalysts can typically be bound with a binder or matrix material prior to use. Binders can be resistant to temperatures of the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders. The matrix can be in the form of a co-gel. The bound ZSM-48 may range from 10 to 100 wt. % ZSM-48, based on bound ZSM-48 with the balance being binder. In some aspects, the ZSM-48 can be bound with a low surface area binder, so that the binder surface area of the bound catalyst is 100 $m^2$/g or less, or 80 $m^2$/g or less, or 70 $m^2$/g or less.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 wt % to 30 wt. %, based on catalyst. For example, the amount of hydrogenation metals can be at least 0.1 wt %, or at least 0.3 wt %, or at least 0.5 wt %, or at least 0.75 wt %, or at least 1.0 wt %, or at least 1.5 wt %, or at least 2 wt %, or at least 5 wt %. Additionally or alternately, the amount of hydrogenation metals can be 30 wt % or less, such as 20 wt % or less, or 15 wt % or less, or 10 wt % or less, or 5 wt % or less, or 2 wt % or less. In aspects where the hydrogenation metal(s) are selected to be one or more noble metals, the amount of hydrogenation metals can preferably be 2 wt % or less, such as 1.5 wt % or less, or 1.0 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be exposed to a post-synthesis treatment prior to use. For example, the catalyst may be steamed prior to use. Examples of suitable conditions for using steaming as a post-synthesis treatment can include steaming a catalyst for 1 hour to 72 hours at a temperature of 200° F. (93° C.) to 1500° F. (815° C.). The amount of water vapor present during the steaming can be any convenient percentage of the total gas phase environment, such as about 0.1 to 100 mole percent of the gas phase environment.

The ZSM-48 crystals can have an Alpha value of at least 10, and preferably at least 20, such as at least 30. Additionally or alternately, the alpha value can be 250 or less. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395.

To the extent desired, the original cations of the as-synthesized material, such as alkali metal cations, can be replaced in accordance with techniques well known in the art, at least in part, by ion exchange with other cations. Preferred replacing cations can include metal ions, hydrogen ions, hydrogen precursor, e.g., ammonium ions and mixtures thereof. Particularly preferred cations can be those which tailor the catalytic activity for certain hydrocarbon conversion reactions. These can include hydrogen, rare earth metals and metals of Groups IIA, IIIA, IVA, VA, IB, IIB, IIIB, IVB, VB, VIB, VIIB and VIII of the Periodic Table of the Elements.

The crystalline material of this disclosure, when employed either as an adsorbent or as a catalyst in an organic compound conversion process can be dehydrated, at least partially. This can be done by heating to a temperature in the range of 200° C. to 370° C. in an atmosphere such as air or nitrogen, and at atmospheric, subatmospheric or superatmospheric pressures for between 30 minutes and 48 hours. Dehydration can also be performed at room temperature merely by placing the ZSM-48 in a vacuum, but a longer time is required to obtain a sufficient amount of dehydration.

Optionally, the crystals can also be calcined at a temperature of 350° C. to 925° C. for 1 to 20 minutes. To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor to exit the crystal structure while reducing or minimizing damage and/or morphology changes in the crystals.

The above text describes synthesis of ZSM-48 as an example of the more general methodology for forming zeolites using a dominant structure directing agent and a secondary structure directing agent. Although ZSM-48 is explicitly discussed, those of skill in the art will understand that the synthesis methods for a variety zeolites are known in the art. Such known synthesis procedures can be readily adapted to make use of a dominant structure directing agent and a secondary structure directing agent as described herein.

The crystalline molecular sieve(s) produced by the present process can be used to catalyze a wide variety of organic compound conversion processes including many of present commercial/industrial importance. Examples of chemical conversion processes effectively catalyzed by the crystalline material of this disclosure, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from 10° C. to 250° C., a pressure from 0 psig to 500 psig (about 3.5 MPag), a total weight hourly space velocity (WHSV) from 0.5 $hr^{-1}$ to 100 $hr^{-1}$, and an aromatic/olefin mole ratio from 0.1 to 50;

(b) alkylation of aromatics with long chain (C.sub.10-C.sub.20) olefins, in the gas or liquid phase, with reaction conditions optionally including one or more of a temperature from 250° C. to 500° C., a pressure from 0 psig to 500 psi, (about 3.5 MPag), a total WHSV from 0.5 $hr^{-1}$ to 50 $hr^{-1}$, and an aromatic/olefin mole ratio from 1 to 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from 100° C. to 500° C., a pressure from 1 psig (about 7 kPag) to 500 psig (about 3.5 MPag), and a WHSV from 1 $hr^{-1}$ to 10,000 $hr^{-1}$;

(d) disproportionation of alkylaromatics, e.g., disproportionation of toluene to produce xylenes, with reaction conditions optionally including one or more of a temperature from 200° C. to 760° C., a pressure from 1 atm (about 0 psig) to 60 atm (about 5.9 MPag), a WHSV from 0.1 $hr^{-1}$ to 20 $hr^{-1}$, and a hydrogen/hydrocarbon mole ratio from 0 (no added hydrogen) to 50;

(e) dealkylation of alkylaromatics, e.g., deethylation of ethylbenzene, with reaction conditions optionally including one or more of a temperature from 200° C. to 760° C., a pressure from 1 atm (about 0 psig) to 60 atm (about 5.9 MPag), a WHSV from 0.1 $hr^{-1}$ to 20 $hr^{-1}$, and a hydrogen to hydrocarbon mole ratio from 0 (no added hydrogen) to 50;

(f) isomerization of alkylaromatics, such as xylenes, with reaction conditions optionally including one or more of a temperature from 200° C. to 540° C., a pressure from 100 kPaa to 7 MPaa, a WHSV from 0.1 $hr^{-1}$ to 50 $hr^{-1}$, and a hydrogen/hydrocarbon mole ratio from 0 (no added hydrogen) to 10;

(g) reaction of paraffins with aromatics, e.g., to form alkylaromatics and light gases, with reaction conditions optionally including one or more of a temperature from 260° C. to 375° C., a pressure from 0 psig to 1000 psig (about 6.9 MPag), a WHSV from 0.5 $hr^{-1}$ to 10 $hr^{-1}$, and a hydrogen/hydrocarbon mole ratio from 0 (no added hydrogen) to 10;

(h) paraffin isomerization to provide branched paraffins with reaction conditions optionally including one or more of a temperature from 200° C. to 315° C., a pressure from 100 psig (about 690 kPag) to 1000 psig (about 6.9 MPag), a WHSV from 0.5 $hr^{-1}$ to 10 $hr^{-1}$, and a hydrogen to hydrocarbon mole ratio from 0.5 to 10;

(i) alkylation of iso-paraffins, such as isobutane, with olefins, with reaction conditions optionally including one or more of a temperature from −20° C. to 350° C., a pressure from 0 psig to 700 psig (about 4.9 MPag), and a total olefin WHSV from 0.02 $hr^{-1}$ to 10 $hr^{-1}$;

(j) dewaxing of paraffinic feeds with reaction conditions optionally including one or more of a temperature from 200° C. to 450° C., a pressure from 0 psig to 3000 psig (about 20.7 MPag), a WHSV from 0.2 $hr^{-1}$ to 10 $hr^{-1}$, and a hydrogen/hydrocarbon mole ratio from 0.5 to 10;

(k) cracking of hydrocarbons with reaction conditions optionally including one or more of a temperature from 300° C. to 700° C., a pressure from 0.1 atm (about 10 kPag) to 204 atm (about 21 MPag), and a WHSV from 0.1 $hr^{-1}$ to 20 $hr^{-1}$;

(l) isomerization of olefins with reaction conditions optionally including one or more of a temperature from 250° C. to 750° C., an olefin partial pressure from 30 kPa to 300 kPa, and a WHSV from 0.5 $hr^{-1}$ to 500 $hr^{-1}$;

(m) aromatic saturation of hydrocarbons with reaction conditions optionally include one or more of a temperature from 125° C. to 425° C., a hydrogen partial pressure from 250 psig (1.7 MPa) to 3000 psig (20.7 MPa), and a liquid hourly space velocity from 0.1 $hr^{-1}$ to 10 $hr^{-1}$ LHSV; and (n) a hydrocarbon trap (e.g., pre-catalytic converter adsorbent) for cold start emissions in motor vehicles.

Feedstocks

A wide range of petroleum and chemical feedstocks can be hydroprocessed in reaction systems that include a dewaxing catalyst formed using a plurality of structure directing agents. Suitable feedstocks include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil.

Typical feeds include, for example, feeds with an initial boiling point of at least 650° F. (343° C.), or at least 700° F. (371° C.), or at least 750° F. (399° C.). Alternatively, a feed may be characterized using a T5 boiling point, such as a feed with a T5 boiling point of at least 650° F. (343° C.), or at least 700° F. (371° C.), or at least 750° F. (399° C.). In some aspects, the final boiling point of the feed can be at least 1100° F. (593° C.), such as at least 1150° F. (621° C.) or at least 1200° F. (649° C.). In other aspects, a feed may be used that does not include a large portion of molecules that would traditional be considered as vacuum distillation bottoms. For example, the feed may correspond to a vacuum gas oil feed that has already been separated from a traditional vacuum bottoms portion. Such feeds include, for example, feeds with a final boiling point of 1150° F. (621° C.), or 1100° F. (593° C.) or less, or 1050° F. (566° C.) or less. Alternatively, a feed may be characterized using a T95 boiling point, such as a feed with a T95 boiling point of 1150° F. (621° C.) or less, or 1100° F. (593° C.) or less, or 1050° F. (566° C.) or less. An example of a suitable type of feedstock is a wide cut vacuum gas oil (VGO) feed, with a T5 boiling point of at least 700° F. (371° C.) and a T95 boiling point of 1100° F. or less. Optionally, the initial boiling point of such a wide cut VGO feed can be at least 700° F. and/or the final boiling point can be at least 1100° F. It is noted that feeds with still lower initial boiling points and/or T5 boiling points may also be suitable, so long as sufficient higher boiling material is available so that the overall nature of the process is a lubricant base oil production process and/or a fuels hydrocracking process.

In embodiments involving an initial sulfur removal stage prior to hydrocracking, the sulfur content of the feed can be at least 300 ppm by weight of sulfur, or at least 1000 wppm, or at least 2000 wppm, or at least 4000 wppm, or at least 10,000 wppm, or at least 20,000 wppm. In other embodiments, including some embodiments where a previously hydrotreated and/or hydrocracked feed is used, the sulfur content can be 2000 wppm or less, or 1000 wppm or less, or 500 wppm or less, or 100 wppm or less.

In this discussion, the distillate boiling range is defined as 350° F. (177° C.) to 700° F. (371° C.). Distillate boiling range products can include products suitable for use as kerosene products (including jet fuel products) and diesel products, such as premium diesel or winter diesel products. The lubricant boiling range is defined as 700° F. (371° C.) to 950° F. (482° C.). The naphtha boiling range is defined as 100° F. (37° C.) to 350° F. (177° C.).

Group I basestocks or base oils are defined as base oils with less than 90 wt % saturated molecules and/or at least 0.03 wt % sulfur content. Group I basestocks also have a viscosity index (VI) of at least 80 but less than 120. Group II basestocks or base oils contain at least 90 wt % saturated molecules and less than 0.03 wt % sulfur. Group II basestocks also have a viscosity index of at least 80 but less than 120. Group III basestocks or base oils contain at least 90 wt % saturated molecules and less than 0.03 wt % sulfur, with a viscosity index of at least 120. In addition to the above formal definitions, some Group I basestocks may be referred to as a Group I+ basestock, which corresponds to a Group I basestock with a VI value of 103 to 108. Some Group II basestocks may be referred to as a Group II+ basestock, which corresponds to a Group II basestock with a VI of at least 113. Some Group III basestocks may be referred to as a Group III+ basestock, which corresponds to a Group III basestock with a VI value of at least 130.

Example of Reaction System for Hydroprocessing

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In the discussion herein, reference will be made to a hydroprocessing reaction system. The hydroprocessing reaction system corresponds to the one or more stages, such as two stages and/or reactors and an optional intermediate separator, that are used to expose a feed to a plurality of catalysts under hydroprocessing conditions. The plurality of catalysts can be distributed between the stages and/or reactors in any convenient manner, with some preferred methods of arranging the catalyst described herein.

Various types of hydroprocessing can be used in the production of lubricant base oils, including production of lubricant base oils as one of several products generated during a fuels hydrocracking process. Typical processes include a hydrocracking process to provide uplift in the viscosity index (VI) of the feed. The hydrocracked feed can then be dewaxed to improve cold flow properties, such as pour point or cloud point. The hydrocracked, dewaxed feed can then be hydrofinished, for example, to remove aromatics from the lubricant base stock product. This can be valuable for removing compounds that are considered hazardous under various regulations. In addition to the above, a preliminary hydrotreatment and/or hydrocracking stage can also be used for contaminant removal.

FIG. 9 shows an example of a reaction system for hydroprocessing of a feed for fuels and/or lubricant base oil production. In the example shown in FIG. 9, a suitable feed 905 can be introduced into a first reactor (or reactors) 910. Hydrogen can also be introduced at various locations within the reaction system, such as hydrogen-containing stream 901. Reactor 910 is schematically shown as including at least one bed 912 of hydrotreating catalyst and at least one bed 914 of hydrocracking catalyst. Either hydrotreating catalyst bed (or beds) 912 or hydrocracking bed (or beds) 914 can be optional. After exposing the feed to the hydrotreating and/or hydrocracking catalyst under effective conditions, the resulting first effluent 917 can be passed into a separator 920. In some aspects, separator 920 can be a gas-liquid type separator for removing contaminant gases 923 generated during hydrotreatment and/or hydrocracking, such as $H_2S$ or $NH_3$. This can allow subsequent stages or catalyst beds in the reaction system to operate as "sweet" reaction stages. In other aspects, separator 920 can allow for separation of liquid hydrocarbon products 928 from the effluent that are below a desired cut point. For example, for a system for lubricant base oil production, separator 920 can allow for separation of both diesel and naphtha boiling range compounds, optionally as one or more separate streams, such as one or more diesel streams, one or more kerosene or jet streams, and/or one or more naphtha streams. As another example, for a system for diesel fuel production, separator 920 might separate out diesel and lower boiling range compounds, or separator 920 may separate out naphtha boiling range compounds while retaining diesel with the primary process flow.

After passing through separator 920, the remaining portion 925 of the effluent can be passed into a second reactor (or reactors) 930. In the example shown in FIG. 9, reactor 930 includes at least one (optional) bed 932 of a hydrotreating and/or hydrocracking catalyst and at least one bed 936 of a dewaxing catalyst. The dewaxing catalyst bed 936 can include at least a portion of a ZSM-48 catalyst made using a plurality of structure directing agents, as described herein. The resulting dewaxed effluent 937 can then be passed into a third reactor (or reactors) 940 for exposure to at least one (optional) bed 948 of hydrofinishing and/or aromatic saturation catalyst. Either the dewaxed effluent 937 or the hydrofinished effluent 947 can be fractionated (not shown) in order to form one or more product streams, such as lubricant base oils, distillate fuel fractions, or naphtha fuel fractions.

Additional details regarding suitable conditions for the various types of hydroprocessing schematically shown in FIG. 9 are provided below.

Hydrotreatment Conditions

Hydrotreatment can typically be used to reduce the sulfur, nitrogen, and aromatic content of a feed. The catalysts used for hydrotreatment can include conventional hydroprocessing catalysts, for example those that comprise at least one Group VIII non-noble metal (Columns 8-10 of IUPAC periodic table), such as Fe, Co, and/or Ni, optionally Co and/or Ni; and at least one Group VI metal (Column 6 of IUPAC periodic table), such as Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant base oil) boiling range feed in a conventional manner may be used. It is noted that more than one type of hydroprocessing catalyst can be used in one or multiple reaction vessels.

The at least one Group VIII non-noble metal, in oxide form, can be present in an amount ranging from 2 wt % to 40 wt %, or from 4 wt % to 15 wt %. The at least one Group VI metal, in oxide form, can be present in an amount ranging from 2 wt % to 70 wt %, or for supported catalysts from 6 wt % to 40 wt % or from 10 wt % to 30 wt %. These weight percents are based on the total weight of the catalyst. Suitable metal catalysts can include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. In aspects where the treat gas stream introduced into a reaction stage contains components other than hydrogen, the treat gas can contain at least 50 vol. %, or at least 75 vol. % hydrogen, or at least 90 vol % hydrogen, or at least 95 vol % hydrogen, or at least 99 vol % hydrogen.

Hydrogen can be supplied at a rate of from 100 SCF/B (standard cubic feet of hydrogen per barrel of feed) (17 $Nm^3/m^3$) to 1500 SCF/B (253 $Nm^3/m^3$). Preferably, the hydrogen is provided in a range of from 200 SCF/B (34 $Nm^3/m^3$) to 1200 SCF/B (202 $Nm^3/m^3$). Hydrogen can be supplied co-currently with the input feed to the hydrotreatment reactor and/or reaction zone or separately via a separate gas conduit to the hydrotreatment zone.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.7 MPag); liquid hourly space velocities (LHSV) of 0.1 $hr^{-1}$ to 10 $hr^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

Hydrocracking Conditions

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of molecules boiling above 700° F. to molecules boiling below 700° F. include converting at least 25% of the 700° F.+ portion of the feedstock to the stage(s) of the reaction system, or at least 40% of the 700° F.+ portion, or at least 50%, or at least 60%, or at least 70%, or at least 75%. Additionally or alternately, the amount of conversion for the reaction system can be 85% or less, or 80% or less, or 75% or less, or 70% or less, or 60% or less, or 50% or less. Each of the above lower bounds on the amount of conversion is explicitly contemplated in conjunction with each of the above upper bounds. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels production and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 $m^3/m^3$ to 1068 $m^3/m^3$ (1200 SCF/B to 6000 SCF/B). The LHSV relative to only the hydrocracking catalyst can be from 0.25 $h^{-1}$ to 50 $h^{-1}$, such as from 0.5 $h^{-1}$ to 20 $h^{-1}$, and preferably from 1.0 $h^{-1}$ to 4.0 $h^1$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be 40° F. (22° C.) less than the temperature for a hydrocracking process in the first stage, or 80° F. (44° C.) less, or 120° F. (66° C.) less. The pressure for a hydrocracking process in a second stage can be 100 psig (690 kPa) less than a hydrocracking process in the first stage, or 200 psig (1380 kPa) less, or 300 psig (2070 kPa) less. Additionally or alternately, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of from 250 psig to 5000 psig (1.8 MPag to 34.6 MPag), liquid hourly space velocities of from 0.05 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from 0.2 h$^{-1}$ to 10 h$^{-1}$, such as from 0.5 h$^{-1}$ to 5 h$^{-1}$ and/or from 1 h$^{-1}$ to 4 h$^{-1}$. Depending on the relative amount of hydrocracking catalyst and dewaxing catalyst used, the LHSV relative to only the hydrocracking catalyst can be from 0.25 h$^{-1}$ to 50 h$^{-1}$, such as from 0.5 h$^{-1}$ to 20 h$^{-1}$, and preferably from 1.0 h$^{-1}$ to 4.0 h$^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Catalytic Dewaxing Process

In many aspects, dewaxing catalyst can be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, dewaxing catalyst can be used in a catalyst bed prior to (i.e., upstream relative to the process flow) at least one bed of hydrotreating and/or hydrocracking catalyst.

In various aspects, at least a portion of the dewaxing catalyst can correspond to a ZSM-48 catalyst synthesized using a plurality of structure directing agents, as described herein. Such a dewaxing catalyst can be used alone, or in conjunction with one or more other additional dewaxing catalysts.

Additional suitable dewaxing catalysts can include molecular sieves such as crystalline aluminosilicates (zeolites). In an embodiment, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22; for example EU-2, EU-11, ZBM-30, ZSM-48, or ZSM-23; such as ZSM-48. Note that a zeolite having the ZSM-23 structure with a silica to alumina ratio of from 20:1 to 40:1 can sometimes be referred to as SSZ-32. Other molecular sieves that are isostructural with the above materials include NU-10, EU-13, KZ-1, and NU-23. Optionally, the additional dewaxing catalyst(s) can include a binder for the molecular sieve, such as alumina, titania, silica, silica-alumina, zirconia, or a combination thereof, for example alumina and/or titania or silica and/or zirconia and/or titania.

In some aspects, the additional dewaxing catalyst(s) used in processes according to the disclosure can be catalysts with a low ratio of silica to alumina. For example, for ZSM-48, the ratio of silica to alumina in the zeolite can be less than 200:1, such as less than 110:1, or less than 100:1, or less than 90:1, or less than 75:1. In various embodiments, the ratio of silica to alumina can be from 50:1 to 200:1, such as 60:1 to 160:1, or 70:1 to 100:1.

In various aspects, the additional dewaxing catalyst(s) can further include a metal hydrogenation component. The metal hydrogenation component can typically be a Group VI and/or a Group VIII metal, such as a Group VIII noble metal. For example, the metal hydrogenation component can be Pt, Pd, or a mixture thereof. In an alternative aspect, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to an additional catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in an additional dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The additional dewaxing catalysts useful in processes according to the disclosure can also include a binder. In some aspects, the dewaxing catalysts can be formulated using a low surface area binder, a low surface area binder represents a binder with a surface area of 100 m$^2$/g or less, or 80 m$^2$/g or less, or 70 m$^2$/g or less. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Process conditions in a catalytic dewaxing zone can include a temperature of from 200 to 450° C., preferably 270 to 400° C., a hydrogen partial pressure of from 1.8 MPag to 34.6 MPag (250 psig to 5000 psig), preferably 4.8 MPag to 20.7 MPag, and a hydrogen treat gas rate of from 35.6 m$^3$/m$^3$ (200 SCF/B) to 1781 m$^3$/m$^3$ (10,000 scf/B), preferably 178 m$^3$/m$^3$ (1000 SCF/B) to 890.6 m$^3$/m$^3$ (5000 SCF/B). In still other embodiments, the conditions can include temperatures in the range of 600° F. (343° C.) to 815° F. (435° C.), hydrogen partial pressures of from 500 psig to 3000 psig (3.6 MPag-20.7 MPag), and hydrogen treat gas rates of from 213 m$^3$/m$^3$ to 1068 m$^3$/m$^3$ (1200 SCF/B to 6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 h$^{-1}$ and/or from 1 h$^{-1}$ to 4 h$^{-1}$.

Additionally or alternately, the conditions for dewaxing can be selected based on the conditions for a preceeding reaction in the stage, such as hydrocracking conditions or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed that is at least 10° F. (6° C.) lower than the prior catalyst bed, or at least 20° F. (11° C.) lower, or at least 30° F. (16° C.) lower, or at least 40° F. (21° C.) lower.

As still another option, the dewaxing catalyst in the final reaction stage can be mixed with another type of catalyst, such as hydrocracking catalyst, in at least one bed in a reactor. As yet another option, a hydrocracking catalyst and a dewaxing catalyst can be co-extruded with a single binder to form a mixed functionality catalyst.

Hydrofinishing and/or Aromatic Saturation Process

In some aspects, a hydrofinishing and/or aromatic saturation stage can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on the bottoms from the reaction stage (i.e., the hydrocracker bottoms). Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 hr$^{-1}$ to 5 hr$^{-1}$ LHSV, preferably 0.5 hr$^{-1}$ to 2.0 hr$^{-1}$. Additionally, a hydrogen treat gas rate of from 35.6 m$^3$/m$^3$ to 1781 m$^3$/m$^3$ (200 SCF/B to 10,000 SCF/B) can be used.

After hydroprocessing, the bottoms from the hydroprocessing reaction system can have a viscosity index (VI) of at least 95, such as at least 105 or at least 110. The amount of saturated molecules in the bottoms from the hydroprocessing reaction system can be at least 90%, while the sulfur content of the bottoms is less than 300 wppm. Thus, the bottoms from the hydroprocessing reaction system can be suitable for use as a Group II, Group II+, or Group III lubricant base oil.

ADDITIONAL EMBODIMENTS

Additionally or alternately, the present disclosure can include one or more of the following embodiments.

Embodiment 1

A method for processing a feed using a catalyst formed using a dominant structure directing agent and a secondary structure directing agent, comprising: exposing a feedstock having a T5 boiling point of at least 400° F. (204° C.) to a catalyst comprising ZSM-48 crystals under effective dewaxing conditions to form a dewaxed effluent, at least a portion of the ZSM-48 crystals being crystallized from reaction mixture including a dominant structure directing agent cation and a secondary structure directing agent cation, an amount of secondary structure directing agent cation in the reaction mixture being at least 20 mole % of a combined amount of dominant structure directing agent cation and secondary structure directing agent cation in the reaction mixture, the ZSM-48 crystals having a molar ratio of $SiO_2$ to $Al_2O_3$ of 65 to 120, or less than 90.

Embodiment 2

The method of Embodiment 1, wherein the catalyst has an alpha value of at least 125, or at least 150.

Embodiment 3

The method of any of the above embodiments, wherein the catalyst further comprises a hydrogenation metal, the hydrogenation metal optionally comprising Pt, Pd, Ni, W, Co, Mo, or a combination thereof, the amount of hydrogenation metal being 0.1 wt % to 20 wt %, or optionally 0.1 wt % to 1.5 wt % when the hydrogenation metal is Pt, Pd, or a combination thereof.

Embodiment 4

The method of any of the above embodiments, wherein the catalyst further comprises a binder, a surface area of the binder in the bound catalyst optionally being 150 m²/g or less, or 100 m²/g or less, or 80 m²/g or less.

Embodiment 5

The method of any of the above embodiments, wherein the effective dewaxing conditions comprise a temperature of from 200 to 450° C., or 270 to 400° C., a hydrogen partial pressure of from 1.8 MPag to 34.6 MPag (250 psig to 5000 psig), or 3.6 MPag to 20.7 MPag (500 psig to 3000 psig), and a hydrogen treat gas rate of from 35.6 m³/m³ (200 SCF/B) to 1781 m³/m³ (10,000 scf/B), preferably 178 m³/m³ (1000 SCF/B) to 890.6 m³/m³ (5000 SCF/B).

Embodiment 6

The method of any of the above embodiments, wherein the dominant structure directing agent cation comprises diquat-5, diquat-6, or a combination thereof.

Embodiment 7

The method of any of the above embodiments, wherein the secondary structure directing agent is tetramethyl ammonium hydroxide, tetraethyl ammonium hydroxide, tetrapropyl ammonium hydroxide, tetrabutyl ammonium hydroxide, or a combination thereof, or optionally wherein the secondary structure directing agent cation is tetraethyl ammonium.

Embodiment 8

The method of any of the above embodiments, wherein a molar ratio of the amount of secondary structure directing agent to the amount of hydroxyl ions is at least 1:10; or wherein the amount of secondary structure directing agent cation is at least 25 mole % of the combined amount of dominant structure directing agent cation and secondary structure directing agent cation, or at least 30 mole %; or a combination thereof.

Embodiment 9

The method of any of the above embodiments, wherein the ZSM-48 crystals are synthesized from a reaction mixture having a molar ratio of combined structure directing agent cation to $SiO_2$ in said reaction mixture of 0.01 to 0.20; a molar ratio of $SiO_2$ to $Al_2O_3$ in said reaction mixture of 50 to 200; a molar ratio of water to $SiO_2$ in said reaction mixture of 1 to 500; a molar ratio of hydroxyl group concentration to $SiO_2$ in said reaction mixture is from 0.1 to 0.3; and a molar ratio of alkali metal, M, to $SiO_2$ in said reaction mixture is from 0.05 to 0.4.

Embodiment 10

The method of any of the above embodiments, wherein at least 50 vol % of the as-synthesized ZSM-48 crystals have a fibrous morphology, or wherein at least 50 vol % of the as-synthesized ZSM-48 crystals have a needle-like morphology.

Embodiment 11

The method of any of the above embodiments, wherein the reaction mixture has a molar ratio of combined structure directing agent cation to $SiO_2$ in said reaction mixture of 0.01 to 0.05; a molar ratio of $SiO_2$ to $Al_2O_3$ in said reaction mixture of 50 to 150; a molar ratio of water to $SiO_2$ in said reaction mixture of 1 to 500; a molar ratio of hydroxyl group concentration to $SiO_2$ in said reaction mixture is from 0.1 to 0.3; and a molar ratio of alkali metal, M, to $SiO_2$ in said reaction mixture is from 0.05 to 0.4, the molar ratio of $SiO_2$ to $Al_2O_3$ in said reaction mixture optionally being 65 to 120.

Embodiment 12

The method of any of the above embodiments, wherein the feedstock has a T5 boiling point of at least 700° F., a sulfur content of 100 wppm or less, or a combination thereof.

Embodiment 13

The method of any of the above embodiments, further comprising separating the dewaxed effluent to form at least one dewaxed diesel boiling range fraction, at least one dewaxed lubricating base oil fraction, or a combination thereof.

Embodiment 14

The method of any of the above embodiments, further comprising hydrofinishing the dewaxed effluent under effective hydrofinishing conditions, the hydrofinishing optionally being performed after separating the dewaxed effluent to form at least one dewaxed diesel boiling range fraction, at least one dewaxed lubricating base oil fraction, or a combination thereof.

Embodiment 15

The method of any of the above embodiments, further comprising hydrotreating the feedstock under effective hydrotreating conditions prior to said exposing, hydrocracking the feedstock under effective hydrocracking conditions prior to said exposing, hydrofinishing the feedstock under effective hydrofinishing conditions prior to said exposing, or a combination thereof.

EXAMPLES

In the following examples, Examples 1-9 correspond to ZSM-48 crystals that were synthesized from synthesis mixtures containing both a dominant structure directing agent and a secondary structure directing agent. In the tables specifying the synthesis mixture ratios, structure directing agent is abbreviated as SDA. The dominant structure directing agent in each of the synthesis mixtures in Examples 1-9 is hexamethonium chloride, which corresponds to the chloride salt of diquat-6. The secondary structure directing agent is a tetraalkyl ammonium hydroxide as specified in each example. In Example 10, the synthesis mixture contained only hexamethonium dihydroxide as a structure directing agent.

Example 1—Preparation of ZSM-48 Using a Mixture of Hexamethonium Chloride and Tetramethyl Ammonium Hydroxide (TMAOH)

A mixture was prepared from 9800 g of water, 380 g of Hexamethonium Chloride (56% solution), 2570 g of Ultrasil silica, 195 g of sodium aluminate solution (43%), 180 g of 25% TMAOH solution, 20 g of ZSM-48 seeds and 280 g of 50% sodium hydroxide solution. The mixture had the following molar composition:

TABLE

Example 1

| Reactants | Molar ratio |
|---|---|
| $SiO_2:Al_2O_3$ | ~82 |
| $H_2O:SiO_2$ | ~15 |
| $OH^-:SiO_2$ | ~0.17 |
| $Na^+:SiO_2$ | ~0.12 |
| Dominant SDA/$SiO_2$ | ~0.02 |
| Secondary SDA/$SiO_2$ | ~0.01 |

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material showed that the material was composed of agglomerates of small irregularly shaped crystals. The resulting ZSM-48 crystals had a $SiO_2/Al_2O_3$ molar ratio of ~80/1. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 110, a hexane sorption of 43.3 mg/g, and a surface area of 301 m²/g, which included 175 m²/g of microporous surface area and 126 m²/g of external surface.

Example 2—Preparation of ZSM-48 Using Hexamethonium Chloride and Tetraethyl Ammonium Hydroxide (TEAOH)

A mixture was prepared from 9800 g of water, 400 g of Hexamethonium Chloride (56% solution), 2570 g of Ultrasil silica, 195 g of sodium aluminate solution (43%), 160 g of 35% TEAOH solution, 20 g of ZSM-48 seeds and 300 g of 50% sodium hydroxide solution. The mixture had the following molar composition:

TABLE

Example 2

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+:SiO_2$ | ~0.02 |
| Dominant SDA/$SiO_2$ | ~0.02 |
| Secondary SDA/$SiO_2$ | ~0.01 |

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material showed that the material was composed of agglomerates of small crystals. The resulting ZSM-48 crystals had a $SiO_2/Al_2O_3$ molar ratio of ~76.8. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 130, a hexane sorption of 48.5 mg/g, and a surface area of 308 m²/g, which included 195 m²/g of microporous surface area and 113 m²/g of external surface.

Example 3—Preparation of ZSM-48 Using Hexamethonium Chloride and Tetraethyl Ammonium Hydroxide (TEAOH)

A mixture was prepared from 9800 g of water, 440 g of Hexamethonium Chloride (56% solution), 2570 g of Ultrasil silica, 195 g of sodium aluminate solution (43%), 160 g of 35% TEAOH solution, 20 g of ZSM-48 seeds and 300 g of 50% sodium hydroxide solution. The mixture had the following molar composition:

TABLE

Example 3

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+:SiO_2$ | ~0.13 |
| Dominant SDA/$SiO_2$ | ~0.022 |
| Secondary SDA/$SiO_2$ | ~0.01 |

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of small crystals. The resulting ZSM-48 crystals had a $SiO_2/Al_2O_3$ molar ratio of ~76.1. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 130, a hexane sorption of 47.3 mg/g, and a surface area of 322 m²/g, which included 209 m²/g of microporous surface area and 113 m²/g of external surface.

Example 4—Preparation of ZSM-48 Using Hexamethonium Chloride and Tetraethyl Ammonium Hydroxide (TEAOH)

A mixture was prepared from 9800 g of water, 520 g of Hexamethonium Chloride (56% solution), 2570 g of Ultrasil silica, 195 g of sodium aluminate solution (43%), 160 g of 35% TEAOH solution, 20 g of ZSM-48 seeds and 300 g of 50% sodium hydroxide solution. The mixture had the following molar composition:

TABLE

Example 4

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+/SiO_2$ | ~0.13 |
| Dominant SDA/$SiO_2$ | ~0.026 |
| Secondary SDA/$SiO_2$ | ~0.01 |

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical ZSM-48 topology with trace of ZSM-50 impurity. The SEM of the as-synthesized material showed that the material was composed of agglomerates of small crystals. The resulting ZSM-48 crystals had a $SiO_2/Al_2O_3$ molar ratio of ~77. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 150, a hexane sorption of 50.8 mg/g, and surface area of 339 m²/g, which included 233 m²/g of microporous surface area and 106 m²/g of external surface.

Example 5—Preparation of ZSM-48 Using Hexamethonium Chloride and Tetraethyl Ammonium Hydroxide (TEAOH)

A mixture was prepared from 9800 g of water, 360 g of Hexamethonium Chloride (56% solution), 2570 g of Ultrasil silica, 195 g of sodium aluminate solution (43%), 320 g of 35% TEAOH solution, 20 g of ZSM-48 seeds and 300 g of 50% sodium hydroxide solution. The mixture had the following molar composition:

TABLE

Example 5

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+/SiO_2$ | ~0.13 |
| Dominant SDA/$SiO_2$ | ~0.018 |
| Secondary SDA/$SiO_2$ | ~0.02 |

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology, as shown in FIG. 1. The SEM of the as-synthesized material, as shown in FIG. 4, shows that the material was composed of agglomerates of small crystals. The resulting ZSM-48 crystals had a $SiO_2/Al_2O_3$ molar ratio of ~76.1. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 140, a hexane sorption of 49.4 mg/g, and a surface area of 309 m²/g which included 176 m²/g of microporous surface area and 133 m²/g of external surface.

Example 6—Preparation of ZSM-48 Using Hexamethonium Chloride and Tetraethyl Ammonium Hydroxide (TEAOH)

A mixture was prepared from 9800 g of water, 400 g of Hexamethonium Chloride (56% solution), 2570 g of Ultrasil silica, 210 g of sodium aluminate solution (43%), 160 g of 35% TEAOH solution, 20 g of ZSM-48 seeds and 300 g of 50% sodium hydroxide solution. The mixture had the following molar composition:

TABLE

Example 6

| Reactants | Molar ratio |
|---|---|
| $SiO_2:Al_2O_3$ | ~82 |
| $H_2O:SiO_2$ | ~15 |
| $OH^-:SiO_2$ | ~0.15 |
| $Na^+/SiO_2$ | ~0.13 |
| Dominant SDA/$SiO_2$ | ~0.02 |
| Secondary SDA/$SiO_2$ | ~0.01 |

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material showed that the material was composed of agglomerates of small crystals. The resulting ZSM-48 crystals had a $SiO_2/Al_2O_3$ molar ratio of ~69. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 150, a hexane sorption of 48.9 mg/g, and a surface area of 288 m$^2$/g, which included 170 m$^2$/g of microporous surface area and 158 m$^2$/g of external surface.

Example 7—Preparation of ZSM-48 Using Hexamethonium Chloride and Tetraethyl Ammonium Hydroxide (TEAOH)

A mixture was prepared from 9800 g of water, 400 g of Hexamethonium Chloride (56% solution), 2570 g of Ultrasil silica, 210 g of sodium aluminate solution (43%), 160 g of 35% TEAOH solution, 20 g of ZSM-48 seeds and 300 g of 50% sodium hydroxide solution. The mixture had the following molar composition:

TABLE

Example 7

| Reactants | Molar ratio |
|---|---|
| SiO$_2$:Al$_2$O$_3$ | ~76 |
| H$_2$O:SiO$_2$ | ~15 |
| OH$^-$:SiO$_2$ | ~0.16 |
| Na$^+$/SiO$_2$ | ~0.13 |
| Dominant SDA/SiO$_2$ | ~0.02 |
| Secondary SDA/SiO$_2$ | ~0.01 |

The mixture was reacted at 330° F. (165.6° C.) in a 5-gal autoclave with stirring at 250 RPM for 36 hours. The product was filtered, washed with deionized (DI) water and dried at 250° F. (120° C.). The XRD pattern of the as-synthesized material showed the typical pure phase of ZSM-48 topology, as shown in FIG. 2. The SEM of the as-synthesized material, as shown in FIG. 5, showed that the material was composed of agglomerates of small crystals. The resulting ZSM-48 crystals had a SiO$_2$/Al$_2$O$_3$ molar ratio of 65:1 to 75:1. It is noted that synthesis mixture used to form the ZSM-48 crystals in this example has a lower SiO$_2$/Al$_2$O$_3$ molar ratio than would be expected for a synthesis mixture having a single structure directing agent. In this example, the as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting H-ZSM-48 crystals had an Alpha value of 150, a hexane sorption of less than 50.3, and a surface area of 324 m$^2$/g, which included 176 m$^2$/g of microporous surface area and 148 m$^2$/g of external surface area.

Example 8—Preparation of ZSM-48 Using Hexamethonium Chloride and Tetraethyl Ammonium Hydroxide (TEAOH)

A mixture was prepared from 9800 g of water, 400 g of Hexamethonium Chloride (56% solution), 2570 g of Ultrasil silica, 210 g of sodium aluminate solution (43%), 160 g of 35% TEAOH solution, 20 g of ZSM-48 seeds and 300 g of 50% sodium hydroxide solution. The mixture had the following molar composition:

TABLE

Example 8

| Reactants | Molar ratio |
|---|---|
| SiO$_2$:Al$_2$O$_3$ | ~76 |
| H$_2$O:SiO$_2$ | ~15 |
| OH$^-$:SiO$_2$ | ~0.16 |
| Na$^+$/SiO$_2$ | ~0.13 |
| Dominant SDA/SiO$_2$ | ~0.02 |
| Secondary SDA/SiO$_2$ | ~0.01 |

The mixture was reacted at 340° F. (171.1° C.) in a 5-gal autoclave with stirring at 250 RPM for 36 hours. The product was filtered, washed with deionized (DI) water and dried at 250° F. (120° C.). The XRD pattern of the as-synthesized material showed the typical pure phase of ZSM-48 topology. The SEM of the as-synthesized material showed that the material was composed of agglomerates of small crystals The resulting ZSM-48 crystals had a SiO$_2$/Al$_2$O$_3$ molar ratio of 70/1.

Example 9—Preparation of ZSM-48 Using Hexamethonium Chloride and Tetraethyl Ammonium Hydroxide (TEAOH)

A mixture was prepared from 9800 g of water, 360 g of Hexamethonium Chloride (56% solution), 2570 g of Ultrasil silica, 210 g of sodium aluminate solution (43%), 320 g of 35% TEAOH solution, 20 g of ZSM-48 seeds, and 300 g of 50% sodium hydroxide solution. The mixture had the following molar composition:

TABLE

Example 9

| Reactants | Molar ratio |
|---|---|
| SiO$_2$:Al$_2$O$_3$ | ~76 |
| H$_2$O:SiO$_2$ | ~15 |
| OH$^-$:SiO$_2$ | ~0.15 |
| Na$^+$/SiO$_2$ | ~0.13 |
| Dominant SDA/SiO$_2$ | ~0.018 |
| Secondary SDA/SiO$_2$ | ~0.02 |

The mixture was reacted at 340° F. (171.1° C.) in a 5-gal autoclave with stirring at 250 RPM for 24 hours. The product was filtered, washed with deionized (DI) water and dried at 250° F. (120° C.). The XRD pattern of the as-synthesized material showed the typical pure phase of ZSM-48 topology, as shown in FIG. 3. The SEM of the as-synthesized material, as shown in FIG. 6 showed that the material was composed of agglomerates of small crystals. The resulting ZSM-48 crystals had a SiO$_2$/Al$_2$O$_3$ molar ratio of 68.9.

Comparative Example 10: Attempted Synthesis of ZSM-48 from Hexamethonium Dihydroxide A mixture was prepared from 1200 g of water, 45 g of Hexamethonium Dihydroxide (25-50% solution), 228 g of Ultrasil silica, 16 g of sodium aluminate solution (45%), 1.3 g of 98% H$_2$SO$_4$ solution, 10 g of ZSM-48 seeds, and 40 g of 50% sodium hydroxide solution. It is noted that the only potential structure directing agent (SDA) included in the synthesis mixture is the hexamethonium dihydroxide. The sulfuric acid in the reaction mixture is used to control the amount of OH$^-$. The mixture had the following molar composition:

TABLE

Comparative Example 10

| Reactants | Molar ratio |
|---|---|
| $SiO_2:Al_2O_3$ | ~81.3 |
| $H_2O:SiO_2$ | ~20.3 |
| $OH^-:SiO_2$ | ~0.16 |
| $Na^+:SiO_2$ | ~0.17 |
| $SDA/SiO_2$ | ~0.025 |

The mixture was reacted at 320° F. (160° C.) in a 2-liter autoclave with stirring at 250 RPM for 48 hours. The resulting product was filtered, washed with deionized (DI) water and dried at 250° F. (120° C.). The XRD pattern of the as-synthesized material showed that the main phase corresponded to Kenyaite impurity. This example demonstrates that directly using the hexamethonium directing agent with a hydroxide ion does not yield the same results as using hexamethonium chloride as a dominant directing agent and a tetraalkyl ammonium hydroxide as a secondary directing agent.

Examples 11, 12, and 13: Preparation of Bound Catalysts (Steamed) with Supported Pt Bound alumina catalysts were formed by extrusion using 65 wt % of ZSM-48 samples corresponding to Examples 5, 7, and 9 and 35 wt % alumina binder having a surface area greater than about 200 m²/g. The resulting extrudates were calcined in nitrogen (3 hr @ 1000° F.), ammonium exchanged with 1N ammonium nitrate solution, and calcined in air (6 hr @ 1000° F.). The H-formed extrudates were then steamed prior to testing to achieve at least 80% decane isomerization at 90% conversion of decane under decane isomerization conditions as described below. The resulting steamed extrudates were then impregnated via incipient wetness to 0.6 wt % Pt with tetraammineplatinumnitrate followed by calcination in air (3 hr @ 680° F.).

Decane Isomerization

Decane isomerization tests were performed to characterize the activity and selectivity of the samples corresponding to Examples 11, 12, and 13. The test was performed at atmospheric pressure, and the reactor vessel was quartz. Catalysts were crushed and sized to 14/25 mesh, and 1 g of sized catalyst was used for this test. The sample was first heated under nitrogen to 500° F., followed by reduction in hydrogen for 3 hours at atmospheric pressure. The temperature was then decreased to 365° F., and the flow of feed was started. The feed consisted of 100 sccm/min of hydrogen and 0.546 cc/hr of liquid n-decane, delivered by a MFC and ISCO pump, respectively. After lining the catalyst out at this temperature, the product from the reactor was analyzed by an on-line GC, and the next set point temperature was attained. Each catalyst was evaluated at a total of 8 different temperatures from 365° F. to 515° F. For comparison, results are also provided for an alumina bound catalyst containing ZSM-48 crystals formed using only a diquat-6 structure directing agent without a secondary structure directing agent. The comparative ZSM-48 crystals had a silica to alumina ratio of 90:1.

As shown in FIGS. 7 and 8, forming ZSM-48 crystals from synthesis mixtures containing both a dominant and a secondary structure directing agent allowed for formation of ZSM-48 crystals with activity comparable to the activity of ZSM-48 crystals formed using only the dominant structure directing agent. It is noted that the silica to alumina ratio of the ZSM-48 crystals for the catalysts in Examples 11-13 was 70:1, while the catalyst made using the comparative ZSM-48 crystals had a silica to alumina ratio of 90:1. It is believed that the small differences in the selectivity and conversion curves shown in FIGS. 7 and 8 between Examples 11-13 and the comparative catalyst are due at least in part to this difference in silica to alumina ratio.

Example 14—Preparation of Comparative Catalysts

A first comparative catalyst (Comparative Catalyst A) was prepared by forming a bound catalyst that contained 65 wt % of ZSM-48 crystals (having a silica to alumina ratio of 90:1 to 95:1) with 35 wt % of an alumina binder having a surface area greater than about 200 m²/g. The ZSM-48 crystals were formed from a reaction mixture comprising tetraethylammonium hydroxide as the only structure directing agent. The resulting extrudates were calcined in nitrogen (3 h @ 1000° F.) (565° C.), ammonium exchanged with 1N ammonium nitrate solution, and calcined in air (6 h @ 1000° F.). The H-formed extrudates were then post-synthesis treated so that the post-treatment extrudates had an alpha value of about 80. The resulting post-treatment extrudates were then impregnated via incipient wetness to 0.6 wt % Pt with tetra-amminplatinumnitrate followed by calcination in air (3 h @ 680° F.) (360° C.).

A second comparative catalyst (Comparative Catalyst B) was prepared by forming a bound catalyst that contained 65 wt % of ZSM-48 crystals (having a silica to alumina ratio of 70:1 to 75:1) and 35 wt % of an alumina binder having a surface area of less than about 150 m²/g. The ZSM-48 crystals were formed from a reaction mixture comprising tetraethylammonium hydroxide as the only structure directing agent. The resulting extrudates were calcined in nitrogen (3 h @ 1000° F.), ammonium exchanged with 1N ammonium nitrate solution, and calcined in air (6 h @ 1000° F.). The H-formed extrudates were then post-synthesis treated so that the post-treatment extrudates had an alpha value of about 120. The resulting post-treated extrudates were then impregnated via incipient wetness to 0.6 wt % Pt with tetra-amminplatinumnitrate followed by calcination in air (3 h @ 680° F.).

Example 15—Additional Preparation of Catalyst Using Multiple Templates

ZSM-48 crystals were formed using the reaction mixture and synthesis conditions described in Example 7. As noted in Example 7, this resulted in crystals with an Alpha value of 150.

A bound catalyst was formed that included 65 wt % of the ZSM-48 crystals from Example 7 and 35 wt % of an alumina binder having a surface area of less than about 150 m²/g. The resulting extrudates were calcined in nitrogen (3 h @ 1000° F.), ammonium exchanged with 1N ammonium nitrate solution, and calcined in air (6 h @ 1000° F.) to produce H-formed extrudates. The H-formed extrudates were then post-synthesis treated so that the post-treatment extrudates had an alpha value of about 150. Additionally, the post-treatment extrudates had sufficient activity to achieve at least 80% decane isomerization at 90% conversion of decane under decane isomerization conditions as described in association with Examples 11-13. The resulting post-treated extrudates were then impregnated via incipient wetness to 0.6 wt % Pt with tetraamminplatinumnitrate followed by calcination in air (3 h @ 680° F.).

Example 16—Processing of 150N Slack Wax Feed

The catalysts from Examples 14 and 15 were tested to quantify the relative performance of the catalysts. The catalysts were used to dewax a 150N slack wax feed having a wax content of greater than 90 wt %. Additional details the feedstock are shown in Table 11.

TABLE 11

Feedstock Properties

|  | 150N low oil Slack Wax |
| --- | --- |
| Density @ 70° C. (g/cc) | ~0.78 |
| KV @ 100° C. (cSt) | ~3.70 |
| VI | ~174.6 |
| Nitrogen (ppmw) | ~3 |
| Sulfur (ppmw) | ~77 |
| GC Distillation (° C.) | |
| 0.5 wt % | 342.5 |
| 10 wt % | 390.6 |
| 60 wt % | 431.9 |
| 90 wt % | 458.3 |
| 99.5 wt % | 485.9 |
| Total aromatics (μmol/g) by UV absorptivity | 33.2 |
| 1-ring aromatics (μmol/g) by UV absorptivity | 28.4 |

After formulation of the bound catalysts, the catalysts were sized to 14/25 mesh and packed with 80/120 mesh sand in a reactor. For each catalyst, 10 cc of the catalyst was loaded into the reactor. This corresponded to 5.6 g of catalyst for the comparative catalysts, while the catalyst from Example 15 had a weight of 5.1 g. The amount of 80/120 mesh sand loaded with each catalyst was 12.8 g. After loading into the reactor, each catalyst was dried under $N_2$ at 390° F. (200° C.) and 200 psig (1.4 MPag) for 4 hours. The catalyst was then reduced under constant $H_2$ flow at 500° F. (260° C.) for 8 hours. After the catalyst was activated, the reactor was pressurized to 2000 psig (14 MPag) with hydrogen while maintaining hydrogen flow through the reactor. The reactor was then cooled to 300° F. (150° C.).

After the above startup procedure, the 150N slack wax from Table 11 was fed to the reactor at a liquid hourly space velocity (LHSV) of 1.0 $hr^{-1}$. The other reactor conditions included a pressure of 2000 psig (14 MPag), an $H_2$ flow rate (100% $H_2$) of 2000 scf/bbl (360 $Nm^3/m^3$). The reactor temperature started at 300° F. (150° C.). When the first liquid product was collected, that time was defined as a catalyst age of 0 hours. At that point, accumulation of total liquid product was started, and the temperature was increased in the reactor at a ramp rate of 35° F. per hour to reach a temperature of 660° F. The temperature of 660° F. was then maintained for 24 hours to complete catalyst startup and lineout. The catalysts were then tested at various temperatures between 635° F.-680° F. (335° C.-360° C.), as shown in FIGS. 10-13.

Figure 10:
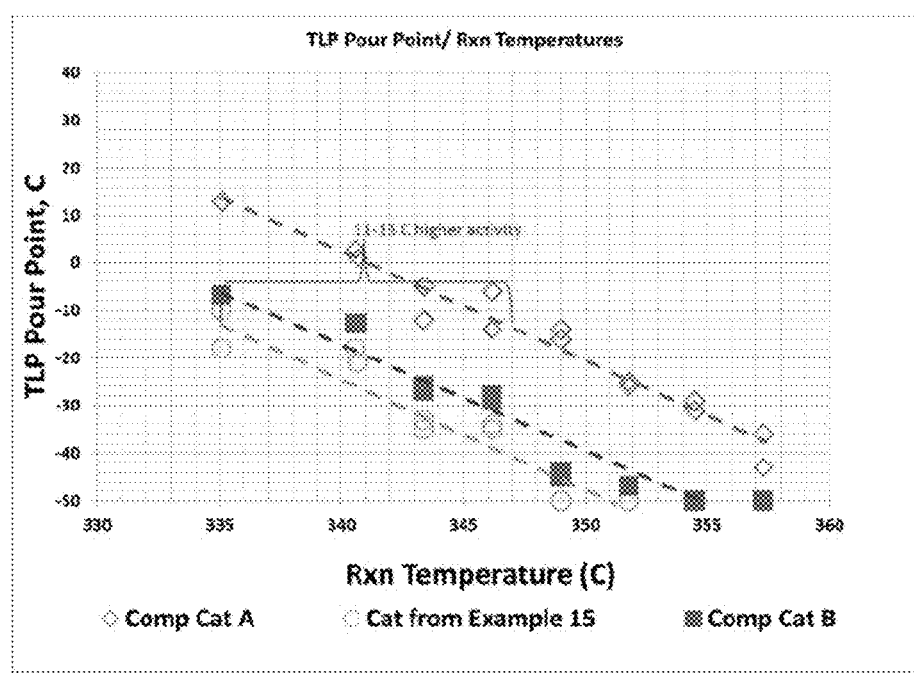
FIG. 10 shows results from processing a slack wax feed with various catalysts.

FIG. 10 shows the pour point of the total liquid product collected by exposing the 150N slack wax feed to each catalyst at various temperatures. In FIG. 10, the diamond shapes correspond to Comparative Catalyst A, the squares correspond to Comparative Catalyst B, and the circles correspond to the catalyst from Example 15. With regard to achieving a desired pour point, as shown in FIG. 10, the catalyst from Example 15 shows an 11° C.-13° C. activity benefit relative to Comparative Catalyst A. The catalyst from Example 15 also shows a 2° C.-3° C. activity benefit relative to Comparative Catalyst B.

Figure 11:
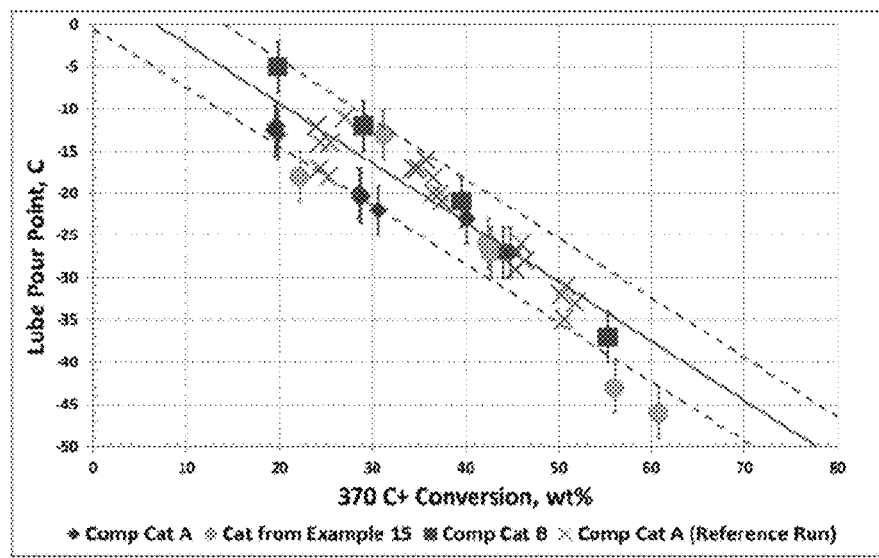
FIG. 11 shows results from processing the slack wax feed with various catalysts.

The improved activity demonstrated in FIG. 10 appears to be achieved without incurring a debit in the yield of the 370° C.+ product. FIG. 11 shows a scatter plot of the pour point for the 370° C.+ product versus the amount of 370° C.+ conversion performed. In FIG. 11, the diamonds and "x" symbols correspond to Comparative Catalyst A, the squares correspond to Comparative Catalyst B, and the circles correspond to the catalyst from Example 15. The amount of 370° C.+ conversion is used here to approximate the amount of loss of yield caused by processing over a catalyst to achieve a target pour point. As shown in FIG. 11, the catalyst from Example 15 and Comparative Catalysts A and B show similar correlations between product pour point and the amount of conversion. This appears to show that the dewaxing activity benefit for the catalyst from Example 15 does not substantially impact the yield of 370° C.+ product generated at a target pour point.

Figure 12:
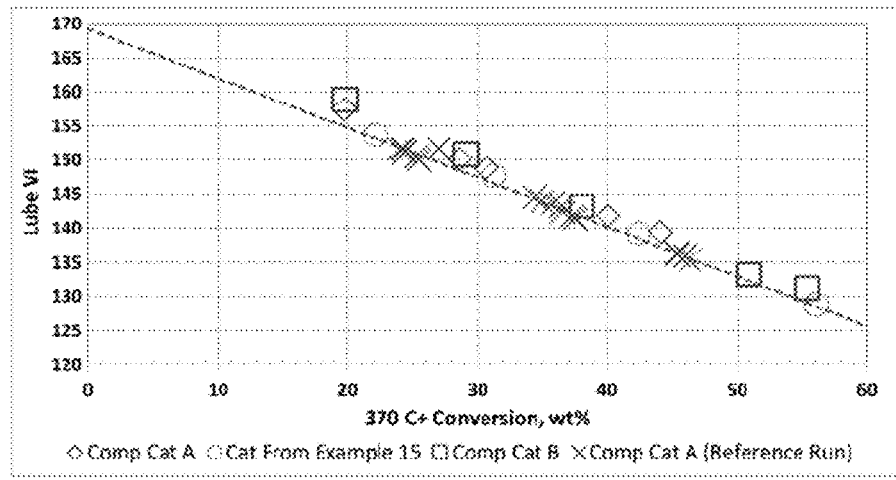
FIG. 12 shows results from processing the slack wax feed with various catalysts.

FIG. 12 shows the viscosity index (VI) for the 370° C.+ product versus the amount of 370° C.+ conversion. In FIG. 12, the diamonds and "x" symbols correspond to Comparative Catalyst A, the squares correspond to Comparative Catalyst B, and the circles correspond to the catalyst from Example 15. Similar to FIG. 11, the viscosity index values for the 370° C.+ product (or the "lube product) from processing over each catalyst appear to have a similar linear relationship relative to the amount of 370° C.+ conversion. Again, this tends to show that the dewaxing activity benefit shown in FIG. 10 for the catalyst in Example 15 does not result in a loss of yield at equivalent viscosity index.

Figure 13:
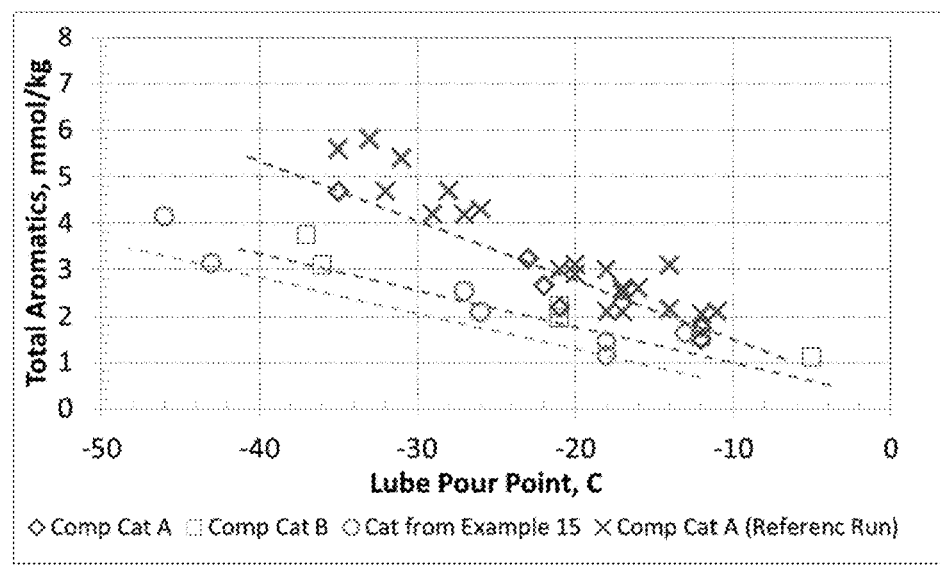
FIG. 13 shows results from processing the slack wax feed with various catalysts.

In addition to providing an apparent improvement in activity for achieving a target pour point, the catalyst from Example 15 also appears to provide a benefit for additional aromatic saturation of the 150N slack wax feed. FIG. 13 shows the total aromatics in the 370° C.+ product as a function of the pour point for the 370° C.+ product. Similar to FIG. 10, the catalyst from Example 15 provides a somewhat larger advantage in additional aromatic saturation relative to Comparative Catalyst A, while the advantage relative to Comparative Catalyst B is smaller.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for processing a feed using a catalyst formed using a dominant structure directing agent and a secondary structure directing agent, comprising:

exposing a feedstock having a T5 boiling point of at least 400° F. (204° C.) to a catalyst comprising ZSM-48 crystals under effective dewaxing conditions to form a dewaxed effluent, at least a portion of the ZSM-48 crystals being crystallized from reaction mixture including a dominant structure directing agent cation, said dominant structure directing agent cation comprising diquat-6 cation, diquat-5 cation or a mixture of diquat-6 cation and a diquat-5 cation, and a secondary structure directing agent cation, an amount of secondary structure directing agent cation in the reaction mixture being at least 20 mole % of a combined amount of dominant structure directing agent cation and secondary structure directing agent cation in the reaction mixture, the ZSM-48 crystals having a molar ratio of $SiO_2$ to $Al_2O_3$ of 65 to 120.

2. The method of claim 1, wherein the catalyst has an alpha value of at least 125.

3. The method of claim 1, wherein the catalyst has an alpha value of at least 150.

4. The method of claim 1, wherein the catalyst further comprises a hydrogenation metal comprising Pt, Pd, Ni, W, Co, Mo, or a combination thereof, the amount of hydrogenation metal being 0.1 wt % to 20 wt %.

5. The method of claim 1, wherein the catalyst further comprises a binder, a surface area of the binder in the bound catalyst being 150 m$^2$/g or less.

6. The method of claim 1, wherein the effective dewaxing conditions comprise a temperature of from 200 to 450° C., a hydrogen partial pressure of from 1.8 MPag to 34.6 MPag (250 psig to 5000 psig), and a hydrogen treat gas rate of from 35.6 m$^3$/m$^3$ (200 SCF/B) to 1781 m$^3$/m$^3$ (10,000 scf/B).

7. The method of claim 1, wherein the secondary structure directing agent comprises tetramethyl ammonium hydroxide, tetraethyl ammonium hydroxide, tetrapropyl ammonium hydroxide, tetrabutyl ammonium hydroxide, or a combination thereof.

8. The method of claim 7, wherein the secondary structure directing agent cation is tetraethyl ammonium.

9. The method of claim 1, wherein a molar ratio of the amount of secondary structure directing agent to the amount of hydroxyl ions is at least 1:10.

10. The method of claim 1, wherein the amount of secondary structure directing agent cation $Q_2$ is at least 25 mole % of the combined amount of dominant structure directing agent cation and secondary structure directing agent cation.

11. The method of claim 1, wherein the ZSM-48 crystals are synthesized from a reaction mixture having a molar ratio of combined structure directing agent cation to SiO$_2$ in said reaction mixture of 0.01 to 0.20; a molar ratio of SiO$_2$ to Al$_2$O$_3$ in said reaction mixture of 50 to 200; a molar ratio of water to SiO$_2$ in said reaction mixture of 1 to 500; a molar ratio of hydroxyl group concentration to SiO$_2$ in said reaction mixture is from 0.1 to 0.3; and a molar ratio of alkali metal, M, to SiO$_2$ in said reaction mixture is from 0.05 to 0.4.

12. The method of claim 1, wherein at least 50 vol % of the as-synthesized ZSM-48 crystals have a fibrous morphology.

13. The method of claim 1, wherein at least 50 vol % of the as-synthesized ZSM-48 crystals have a needle-like morphology.

14. The method of claim 1, wherein the reaction mixture has a molar ratio of combined structure directing agent cation to SiO$_2$ in said reaction mixture of 0.01 to 0.05; a molar ratio of SiO$_2$ to Al$_2$O$_3$ in said reaction mixture of 50 to 150; a molar ratio of water to SiO$_2$ in said reaction mixture of 1 to 500; a molar ratio of hydroxyl group concentration to SiO$_2$ in said reaction mixture is from 0.1 to 0.3; and a molar ratio of alkali metal, M, to SiO$_2$ in said reaction mixture is from 0.05 to 0.4.

15. The method of claim 14, wherein the molar ratio of SiO$_2$ to Al$_2$O$_3$ in said reaction mixture is 65 to 120.

16. The method of claim 1, wherein the feedstock has a T5 boiling point of at least 700° F., a sulfur content of 100 wppm or less, or a combination thereof.

17. The method of claim 1, further comprising separating the dewaxed effluent to form at least one dewaxed diesel boiling range fraction, at least one dewaxed lubricating base oil fraction, or a combination thereof.

18. The method of claim 1, further comprising hydrofinishing the dewaxed effluent under effective hydrofinishing conditions, the hydrofinishing optionally being performed after separating the dewaxed effluent to form at least one dewaxed diesel boiling range fraction, at least one dewaxed lubricating base oil fraction, or a combination thereof.

19. The method of claim 1, further comprising hydrotreating the feedstock under effective hydrotreating conditions prior to said exposing, hydrocracking the feedstock under effective hydrocracking conditions prior to said exposing, hydrofinishing the feedstock under effective hydrofinishing conditions prior to said exposing, or a combination thereof.

* * * * *